US006894686B2

United States Patent
Stamper et al.

(10) Patent No.: US 6,894,686 B2
(45) Date of Patent: May 17, 2005

(54) SYSTEM AND METHOD FOR AUTOMATICALLY EDITING CAPTURED IMAGES FOR INCLUSION INTO 3D VIDEO GAME PLAY

(75) Inventors: Christopher Timothy John Stamper, Warks (GB); Timothy David Joseph Stamper, Warks (GB); Mark Alexis Edmonds, Warks (GB); Russell William Irwin, Warks (GB); Beau Ner Chesluk, Warks (GB); Hirokazu Tanaka, Kyoto (JP); Takashi Ohno, Ishikawa (JP); Noriaki Teramoto, Kyoto (JP); Shigeru Miyamoto, Kyoto (JP); Takao Shimizu, Kyoto (JP); Satoshi Nishiumi, Kyoto (JP); Kazuo Koshima, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 324 days.

(21) Appl. No.: 09/854,942

(22) Filed: May 15, 2001

(65) Prior Publication Data

US 2002/0082082 A1 Jun. 27, 2002

Related U.S. Application Data

(60) Provisional application No. 60/204,546, filed on May 16, 2000.

(51) Int. Cl.[7] .............................................. G06T 15/00
(52) U.S. Cl. .................................................... 345/419
(58) Field of Search ................................ 345/419, 619, 345/629, 473, 474, 475, 423, 426, 427

(56) References Cited

U.S. PATENT DOCUMENTS

| 4,104,625 A | 8/1978 | Bristow et al. ............. 340/324 |
| 4,261,012 A | 4/1981 | Maloomian ................... 358/93 |
| 4,286,849 A | 9/1981 | Uchidoi et al. ............... 354/23 |

(Continued)

FOREIGN PATENT DOCUMENTS

| EP | 0431723 | 6/1991 |
| EP | 0780771 | 6/1997 |
| GB | 2130842 | 6/1984 |

(Continued)

OTHER PUBLICATIONS

"Aris builds digimast future," www.uk.aris.com (Aug. 10, 2000).
"Digimask puts you in picture," www.Sunday–times.co.uk (Mar. 26, 2000).

(Continued)

Primary Examiner—Phu K. Nguyen
(74) Attorney, Agent, or Firm—Nixon & Vanderhye P.C.

(57) ABSTRACT

A video/computer game machine maps external images onto animated game players in a game program. An image of a person's face may be mapped onto the head of an animated game player. The person may then play the game using the animated game player having a face that appears to be that of the person. Similarly, images of other persons can be mapped on other animated game players that appear in the video game program. Improved realism of video games is obtained by enabling individuals to create animated game players that have features, e.g., a facial image, of the individual or that were selected and imported by the individual.

45 Claims, 12 Drawing Sheets

U.S. PATENT DOCUMENTS

| | | | |
|---|---|---|---|
| 4,359,223 A | 11/1982 | Baer et al. .................... 273/85 |
| 4,467,349 A | 8/1984 | Maloomian ................. 358/93 |
| 4,486,774 A | 12/1984 | Maloomian ................. 358/93 |
| 4,517,658 A | 5/1985 | Iida ............................ 364/900 |
| 4,521,014 A | 6/1985 | Sitrick .......................... 273/1 |
| 4,539,585 A | 9/1985 | Spackova et al. ............. 358/93 |
| 4,541,010 A | 9/1985 | Alston .......................... 358/44 |
| 4,566,263 A | 1/1986 | Miyazaki et al. ............. 57/276 |
| 4,591,897 A | 5/1986 | Edelson ....................... 358/22 |
| 4,662,635 A | 5/1987 | Enokian ....................... 273/94 |
| 4,684,995 A | 8/1987 | Baumeister ................. 358/227 |
| 4,688,105 A | 8/1987 | Bloch et al. ................. 358/335 |
| 4,710,873 A | 12/1987 | Breslow et al. ............. 364/410 |
| 4,731,743 A | 3/1988 | Blancato ..................... 364/521 |
| 4,803,554 A | 2/1989 | Pape ........................... 358/209 |
| 4,823,285 A * | 4/1989 | Blancato ..................... 364/521 |
| 4,827,347 A | 5/1989 | Bell ............................ 358/224 |
| 4,858,930 A | 8/1989 | Sato ............................ 273/85 |
| 4,885,702 A | 12/1989 | Ohba .......................... 364/521 |
| 5,016,107 A | 5/1991 | Sasson et al. ................ 358/209 |
| 5,093,731 A | 3/1992 | Watanabe et al. ........... 358/335 |
| 5,095,798 A | 3/1992 | Okada et al. ................. 84/609 |
| 5,111,283 A | 5/1992 | Nagasawa et al. ............ 358/41 |
| 5,111,409 A | 5/1992 | Gasper et al. ............... 395/152 |
| 5,153,729 A | 10/1992 | Saito ........................... 358/209 |
| 5,182,647 A | 1/1993 | Chang .................... 358/213.11 |
| 5,184,830 A | 2/1993 | Okada et al. ................. 273/433 |
| 5,185,665 A | 2/1993 | Okura et al. ................. 358/183 |
| 5,185,818 A | 2/1993 | Warnock ...................... 382/54 |
| 5,191,645 A | 3/1993 | Carlucci et al. ............. 395/159 |
| 5,200,863 A | 4/1993 | Orii ........................... 360/35.1 |
| 5,237,648 A | 8/1993 | Mills et al. ................. 395/133 |
| 5,239,419 A | 8/1993 | Kim ........................... 360/14.1 |
| 5,249,242 A | 9/1993 | Hanson et al. ................ 382/54 |
| 5,255,357 A | 10/1993 | Byron et al. ................ 395/151 |
| 5,262,867 A | 11/1993 | Kojima ....................... 358/209 |
| 5,293,236 A | 3/1994 | Adachi et al. ............... 348/231 |
| 5,301,026 A | 4/1994 | Lee ............................ 348/584 |
| 5,301,267 A | 4/1994 | Hassett et al. ............... 395/150 |
| 5,303,334 A | 4/1994 | Snyder et al. ............... 395/109 |
| 5,305,118 A | 4/1994 | Schiller et al. ............. 358/456 |
| 5,343,243 A | 8/1994 | Maeda ........................ 348/222 |
| 5,363,119 A | 11/1994 | Snyder et al. ............... 345/131 |
| 5,369,736 A | 11/1994 | Kato et al. ................... 395/125 |
| 5,371,540 A | 12/1994 | Tamura et al. .............. 348/222 |
| 5,393,073 A | 2/1995 | Best ............................ 273/434 |
| 5,396,225 A | 3/1995 | Okada et al. ........... 340/825.21 |
| 5,414,444 A | 5/1995 | Britz ........................... 345/156 |
| 5,423,554 A | 6/1995 | Davis ......................... 273/437 |
| 5,430,496 A | 7/1995 | Silverbrook ................. 348/589 |
| 5,437,008 A | 7/1995 | Gay et al. .................... 395/161 |
| 5,438,359 A | 8/1995 | Aoki ........................... 348/207 |
| 5,440,401 A | 8/1995 | Parulski et al. .............. 358/342 |
| 5,442,543 A | 8/1995 | Tresp .......................... 364/149 |
| 5,459,819 A | 10/1995 | Watkins et al. .............. 395/117 |
| 5,469,536 A | 11/1995 | Blank .......................... 395/131 |
| 5,475,441 A | 12/1995 | Parulski et al. .............. 348/552 |
| 5,475,539 A | 12/1995 | Orii ........................... 360/35.1 |
| 5,477,264 A | 12/1995 | Sarbadhikari et al. ....... 348/231 |
| 5,493,409 A | 2/1996 | Maeda et al. ................ 358/296 |
| 5,504,842 A | 4/1996 | Gentile ....................... 395/114 |
| 5,506,944 A | 4/1996 | Gentile ....................... 395/114 |
| 5,519,826 A | 5/1996 | Harper et al. ............... 395/152 |
| 5,524,194 A | 6/1996 | Chida et al. ................ 395/154 |
| 5,533,181 A | 7/1996 | Bergsneider ................ 395/152 |
| 5,539,459 A | 7/1996 | Bullitt et al. ................ 348/254 |
| 5,539,865 A | 7/1996 | Gentile ....................... 395/115 |
| 5,543,835 A | 8/1996 | Mumura ...................... 348/207 |
| 5,544,290 A | 8/1996 | Gentile ....................... 395/115 |
| 5,546,528 A | 8/1996 | Johnston ..................... 395/159 |
| 5,552,799 A | 9/1996 | Hashiguchi ..................... 345/3 |
| 5,553,864 A | 9/1996 | Sitrick .......................... 463/31 |
| 5,577,189 A | 11/1996 | Gay et al. .................... 395/326 |
| 5,581,299 A | 12/1996 | Raney ......................... 348/232 |
| 5,581,311 A | 12/1996 | Kuroiwa ..................... 348/231 |
| 5,586,238 A | 12/1996 | Murata ....................... 395/135 |
| 5,592,609 A | 1/1997 | Suzuki et al. ............... 395/173 |
| 5,595,389 A | 1/1997 | Parulski et al. .............. 436/31 |
| 5,600,767 A | 2/1997 | Kakiyama et al. .......... 395/135 |
| 5,601,487 A | 2/1997 | Oshima et al. ................ 463/4 |
| 5,602,976 A | 2/1997 | Cooper et al. .............. 395/116 |
| 5,612,716 A | 3/1997 | Chida et al. ................. 345/133 |
| 5,612,732 A | 3/1997 | Yuyama et al. ............... 348/14 |
| 5,621,431 A | 4/1997 | Harper et al. ............... 345/122 |
| 5,625,711 A | 4/1997 | Nicholson et al. .......... 382/224 |
| 5,625,716 A | 4/1997 | Borg .......................... 382/254 |
| 5,630,043 A * | 5/1997 | Uhlin .......................... 345/474 |
| 5,631,701 A | 5/1997 | Miyake ....................... 348/222 |
| 5,633,678 A | 5/1997 | Parulski et al. .............. 348/232 |
| 5,633,733 A | 5/1997 | Miyazawa .................. 358/527 |
| 5,633,985 A | 5/1997 | Severson et al. ........... 395/2.76 |
| 5,634,064 A | 5/1997 | Warnick et al. ............. 395/774 |
| 5,638,498 A | 6/1997 | Tyler et al. ................. 395/117 |
| 5,638,502 A | 6/1997 | Murata ....................... 395/117 |
| 5,638,503 A | 6/1997 | Hoel .......................... 395/142 |
| 5,659,490 A | 8/1997 | Imamura .................... 364/526 |
| 5,666,159 A | 9/1997 | Parulski et al. .............. 348/211 |
| 5,680,533 A | 10/1997 | Yamato et al. .............. 395/173 |
| 5,681,223 A | 10/1997 | Weinreich ..................... 472/61 |
| 5,682,197 A | 10/1997 | Moghadam et al. .......... 348/36 |
| 5,689,611 A | 11/1997 | Ohta et al. .................... 386/46 |
| 5,696,850 A | 12/1997 | Parulski et al. .............. 382/261 |
| 5,706,097 A | 1/1998 | Schelling et al. ........... 358/296 |
| 5,706,457 A | 1/1998 | Dwyer et al. ............... 395/349 |
| 5,708,883 A | 1/1998 | Segan et al. ................. 396/339 |
| 5,715,486 A | 2/1998 | Kim et al. ................... 396/229 |
| 5,719,799 A | 2/1998 | Isashi .................... 364/705.01 |
| 5,729,637 A | 3/1998 | Nicholson et al. .......... 382/282 |
| 5,737,452 A | 4/1998 | Schiller ...................... 382/270 |
| 5,737,491 A | 4/1998 | Allen et al. ................ 395/2.79 |
| 5,742,291 A | 4/1998 | Palm .......................... 345/420 |
| 5,745,122 A | 4/1998 | Gay et al. .................... 345/433 |
| 5,748,196 A | 5/1998 | Coelho et al. .............. 345/433 |
| 5,748,326 A | 5/1998 | Thompson-Bell et al. .. 358/296 |
| 5,754,227 A | 5/1998 | Fukuoka ..................... 348/232 |
| 5,781,198 A | 7/1998 | Korn .......................... 345/435 |
| 5,784,525 A | 7/1998 | Bell ............................ 386/107 |
| 5,785,598 A | 7/1998 | Hsu ............................ 463/44 |
| 5,796,429 A | 8/1998 | Suzuki et al. ............... 348/239 |
| 5,828,862 A | 10/1998 | Singkornat et al. ......... 395/442 |
| 5,830,065 A | 11/1998 | Sitrick .......................... 463/31 |
| 5,835,101 A | 11/1998 | Otsuka ....................... 345/501 |
| 5,850,230 A | 12/1998 | San et al. ................... 345/501 |
| 5,880,740 A | 3/1999 | Halliday et al. ............ 345/435 |
| 5,937,081 A | 8/1999 | O'Brill et al. .............. 382/111 |
| 5,984,780 A | 11/1999 | Takemoto et al. ............ 463/20 |
| 6,007,428 A | 12/1999 | Nishiumi et al. ............ 463/36 |
| 6,022,274 A | 2/2000 | Takeda et al. ............... 463/44 |
| 6,026,215 A | 2/2000 | Fantone et al. ............ 395/102 |
| 6,061,532 A | 5/2000 | Bell ............................ 396/661 |
| 6,064,393 A | 5/2000 | Lengyel et al. ............. 345/427 |
| 6,115,036 A | 9/2000 | Yamato et al. .............. 345/328 |
| 6,120,379 A | 9/2000 | Tanaka et al. ................ 463/44 |
| 6,139,432 A | 10/2000 | Watanabe et al. ............ 463/31 |
| 6,208,347 B1 | 3/2001 | Migdal et al. .............. 345/419 |
| 6,227,974 B1 | 5/2001 | Eilat et al. ................... 463/40 |
| 6,229,904 B1 | 5/2001 | Huang et al. ............... 382/100 |
| 6,256,047 B1 | 7/2001 | Isobe et al. ................. 345/473 |
| 6,280,323 B1 | 8/2001 | Yamazaki et al. ............. 463/4 |
| 6,282,362 B1 | 8/2001 | Murphy et al. ............... 386/46 |
| 6,283,858 B1 | 9/2001 | Hayes, Jr. et al. ............ 463/31 |

| | | | |
|---|---|---|---|
| 6,285,381 B1 | 9/2001 | Sawano et al. | 345/726 |
| 6,343,987 B2 | 2/2002 | Hayama et al. | 463/1 |
| 6,538,654 B1 * | 3/2003 | Rose et al. | 345/473 |

FOREIGN PATENT DOCUMENTS

| | | |
|---|---|---|
| GB | 2323738 | 9/1998 |
| GB | 9917742 A | 9/1999 |
| GB | 004165 A | 4/2000 |
| JP | 53-127524 | 11/1978 |
| JP | 54-319 | 1/1979 |
| JP | 54-16320 | 2/1979 |
| JP | 54-179710 | 11/1979 |
| JP | 57-41360 | 3/1982 |
| JP | 57-72666 | 5/1982 |
| JP | 58-24270 | 2/1983 |
| JP | 58-36076 | 3/1983 |
| JP | 60-174598 | 9/1985 |
| JP | 62-167 | 1/1987 |
| JP | 63-213078 | 9/1988 |
| JP | 63-272261 | 11/1988 |
| JP | 2-39195 | 2/1990 |
| JP | 3-139064 | 6/1991 |
| JP | 3-275092 | 12/1991 |
| JP | 4-329758 | 11/1992 |
| JP | 5-110835 | 4/1993 |
| JP | 6-14215 | 1/1994 |
| JP | 6-44215 | 2/1994 |
| JP | 6-96180 | 4/1994 |
| JP | 6-61390 | 8/1994 |
| JP | 7-46462 | 2/1995 |
| JP | 8-18839 | 1/1996 |
| JP | 8-190504 | 7/1996 |
| JP | 8-194697 | 7/1996 |
| JP | 8-202337 | 8/1996 |
| JP | 8-223524 | 8/1996 |
| JP | 8-249329 | 9/1996 |
| JP | 9-140936 | 6/1997 |
| JP | 9-282474 | 10/1997 |
| JP | 11-154240 | 11/1997 |
| WO | WO97/43020 | 11/1997 |
| WO | WO 01/63560 | 8/2001 |

OTHER PUBLICATIONS

"ECTS: Digimask Faces Gaming Partners," The Fastest Game News Online (Sep. 5, 2000).
"Facing the Future, Industry: A New technology called Digimask allows web users to create 3D animations their own faces," www.fgoline.com, (Mar. 29, 2000).
Campbell, Colin, "Digimask Puts Face on Gaming's Future," *Games Business* (May 15, 2000).
Fudge, James, "Digimask at E3Expo 2000," www.cdmag.com (May 3, 2000).
Fudge, James "Digimask Demonstration Released," (Jun. 30, 2000).
Game Boy® Camera Instruction Booklet (1993).
Gelmis, "Nintendo Users Putting on a Game Face," *Newsday* (Oct. 13, 1999).
Owen, Steve, "Old Telstar Crew Shows Its Face," www.gamespot.co.uk (May 26, 2000).
Press release, "Digimask Appoint Foresight for Web Relaunch," www.digimask.com (Jun. 21, 2000).
Press release, "Digimask Prepares to Face its Public," www.digimask.com (Jul. 21, 2000).
Press release, "Digimask Puts Face to Big Game Names," www.digimask.com (Sep. 4, 2000).
Press release, "Hethering Secures £5 Million Funding for Digimask," www.digimask.com (Mar. 31, 2000).
Press release, "Pearce Joins Digimask for New Global Role," www.digimask.com (Sep. 4, 2000).
Press release, "Tomorrow's Not Just Another Day For Digimask," www.digimask.com (Oct. 6, 2000).
Sturgeon, Hannah, 3–d,netimperative.com (Jul. 30, 2000).
Wapshott, Tim, "Face up to reality," The Times Interface 2000, www.Times–archive.co.uk (Oct. 24, 2000).
Web site information, digimask.com (Aug. 2004).
Web site information, ign64–ign.com, "IGN's Best of $E^3$ Awards" Mar. 17, 1999).
Web site information, ign64–ign.com, "Perfect Dark Ditches Face Mapping" (Feb. 2, 2000).
Web site information, ign64–ign.com, "Rare Puts Gamers in the Game" (Mar. 12, 1999).
Web site information, Nintendo Space World '99,www.nintendo.co.jp/n10/spacew99 (4 pages) (1999).
Web site information, tracker.ign.com, RedOctane (Aug. 2004).
Web site information, www.ign.com (Aug. 2004).
Simpson, A. "Mastering WordPerfect 6.1 for Windows Special Edition Second Edition," pp. 16–18, 647,and 1132–1133 (1995).

* cited by examiner

SYSTEM AND METHOD FOR AUTOMATICALLY EDITING CAPTURED IMAGES FOR INCLUSION INTO 3D VIDEO GAME PLAY

This application claims benefit of 60/204,546 filed on May 16, 2000.

BACKGROUND

1. Field

The technology herein relates generally to game machines for playing realistic video and/or computer games. In particular, the technology herein is directed to a game machine having the abilities to capture and/or transfer an image, to manipulate and edit the captured image, to incorporate the captured and/or manipulated captured image into a game that is being played on the game machine, and to map the captured image onto an animated player in the came so that the player has characteristics, e.g., facial features, that are derived from the captured image.

2. Description of Related Art

Video and computer game machines have been known for quite some time. Typically, these game machines include a game machine housing, a processing unit, associated hardware for running a gaming program, and a display for displaying images of the game. The gaming program is typically contained in a game program memory, such as, for example, a semiconductor memory (e.g., ROM, EPROM, etc.) that is part of a removable cartridge or other removable memory device. By storing the gaming program in a removable cartridge, the user is allowed to conveniently and easily change the game being played by simply exchanging the cartridge with one containing a different game. Examples of such game machines are the "N64" and "Game Boy" products manufactured and sold by Nintendo Corporation.

Conventional game machines of the type described above execute the game that is contained in the game program memory of a particular removable cartridge or other removable memory device. The images displayed during game play are limited to those that are contained in a memory of the removable game cartridge. While the images may change based on various inputs received from the user, images of these conventional game machines are generally predefined and are generally not subject to any manipulation, or editing or variation by the user, other than those predetermined changes that occur based on the various situations encountered during game play.

The limited predetermined images available for use in most video games restrict the ability of the user to enjoy the game. It may be more enjoyable for the user to have a more interactive relationship with the game program and the game machine. To that end, what is needed is a game machine that enables the user to define, manipulate, edit and incorporate images into the game being played. This ability would allow the user to personalize the game, including the animated game players that appear in the images of the game.

Additionally, it would be beneficial to provide the user with the ability to capture images for use with a game, and store captured images for use with various other features of the game machine. Image capture and manipulation technologies. e.g., digital cameras, are well known and exist in many forms. Typically, these image capturing and manipulation devices are very costly and are cumbersome to use, especially in the context of a personal game machine. For example, there are many different types of video cameras and digital still cameras available for capturing images. However, video cameras and digital still cameras are sometimes expensive (especially as compared to portable game machines), and have not in the past been much used as a toy or game for children. It also tends to be complicated to manipulate the images captured by these cameras, especially for use in a game environment.

There are also various computer based applications that provide a user with the ability to receive a digital image and to manipulate the digital image. There are also numerous computer programs that enable a user to draw an image or to create animation. However, as set forth above, these known image capturing and manipulation technologies are generally ill suited for portable game use, and are typically prohibitively expensive in the context of gaming applications.

Prior video game systems have been developed that capture a real-life image of an individual's face and insert that facial image onto an animated game player. Such a system is disclosed for example in U.S. Pat. No. 4,710,873 ('873 patent), that is entitled "Video Game Incorporating Digitized Images of Being Into Game Graphics." See also U.S. Pat. Nos. 6,120,379, 6.285,381, 6,435,969. However, further improvements are possible.

SUMMARY

To overcome the above-noted and other deficiencies of game systems, and to improve the enjoyment of game system users, we provide a game machine that maps external images onto animated game players in a game program and includes an image editor to facilitate the mapping. Using a non-limiting exemplary illustrative implementation, an image of a person's face may be mapped onto the head of an animated game player. The person may then play the game using the animated game player having a face that appears to be that of the person. Similarly, images of other persons can be mapped on other animated game players that appear in the video game program. Accordingly, the exemplary non-limiting implementation improves the realism of video games by enabling individuals to create animated game players that have features, e.g., a facial image, of the individual or that were selected and imported by the individual.

These images to be imported into the game program are, in one exemplary implementation, not native to the program. The images may be taken by a digital or video camera, scanned in from a photograph or otherwise captured from an external source. An excellent source of images is a digital camera cartridge that is inserted in the game machine, captures digital pictures and stores them onto a memory device associated with the video game machine. Typically, the captured images will be two-dimensional images of a person, place or thing, such as the face of a person.

The captured digital images are transferred into a game machine running a game program that embodies an image editor. The transferred image is imported into a video editor program module of the video game program. The video editor enables the individual to display the transferred image; manipulate the image, e.g., crop, rotate, enlarge, reduce and adjust the contrast of the image; map the image onto animated game player, such as a three-dimensional head of such a player; change certain features of image painted on the player, such as changing the hair/eye color; and save the player with the mapped 2D image. The individual may also create several different animated game players with different transferred images. Accordingly, the exemplary non-limiting implementation enables individuals to create personalized animated players for video game play. During game play, the individual may select one or more personalized animated players for use during game play.

Advantageous features of preferred exemplary implementations include:

Identifying coordinates on 2D image to be mapped to triangles that form a 3D face;

Still image editor for user of a video game;

Image editor that allows editing of image in 2D and 3D modes;

2D image editing while 3D mapped image is being displayed in real time to show effect of editing;

Selection of various 3D heads on which to map a 2D image, and manipulation of those 3D heads to improve appearance of 2D face mapped on the head;

3D head manipulation of both front view shape and front-to-back distance of head;

Portable storage of a personalized game player;

Random placement of personalized game player faces onto computer controlled players, such as guards;

Mapping of 2D image on 3D face;

Using a digital camera mounted on a hand controller to take pictures for a game console;

Using a digital camera mounted on one hand controller where a 2D image capture memory resides in the digital camera, and a memory for storing a 3D head mapped with the. 2D image is attached to the same or another hand controller;

Personalize game player having a face of the user.

BRIEF DESCRIPTION OF THE DRAWINGS

The present exemplary non-limiting implementation will be described in detail herein with reference to the following drawings, in which like reference numerals refer to like elements, and wherein.

DETAILED DESCRIPTION OF EXEMPLARY IMPLEMENTATIONS

Figure 1:
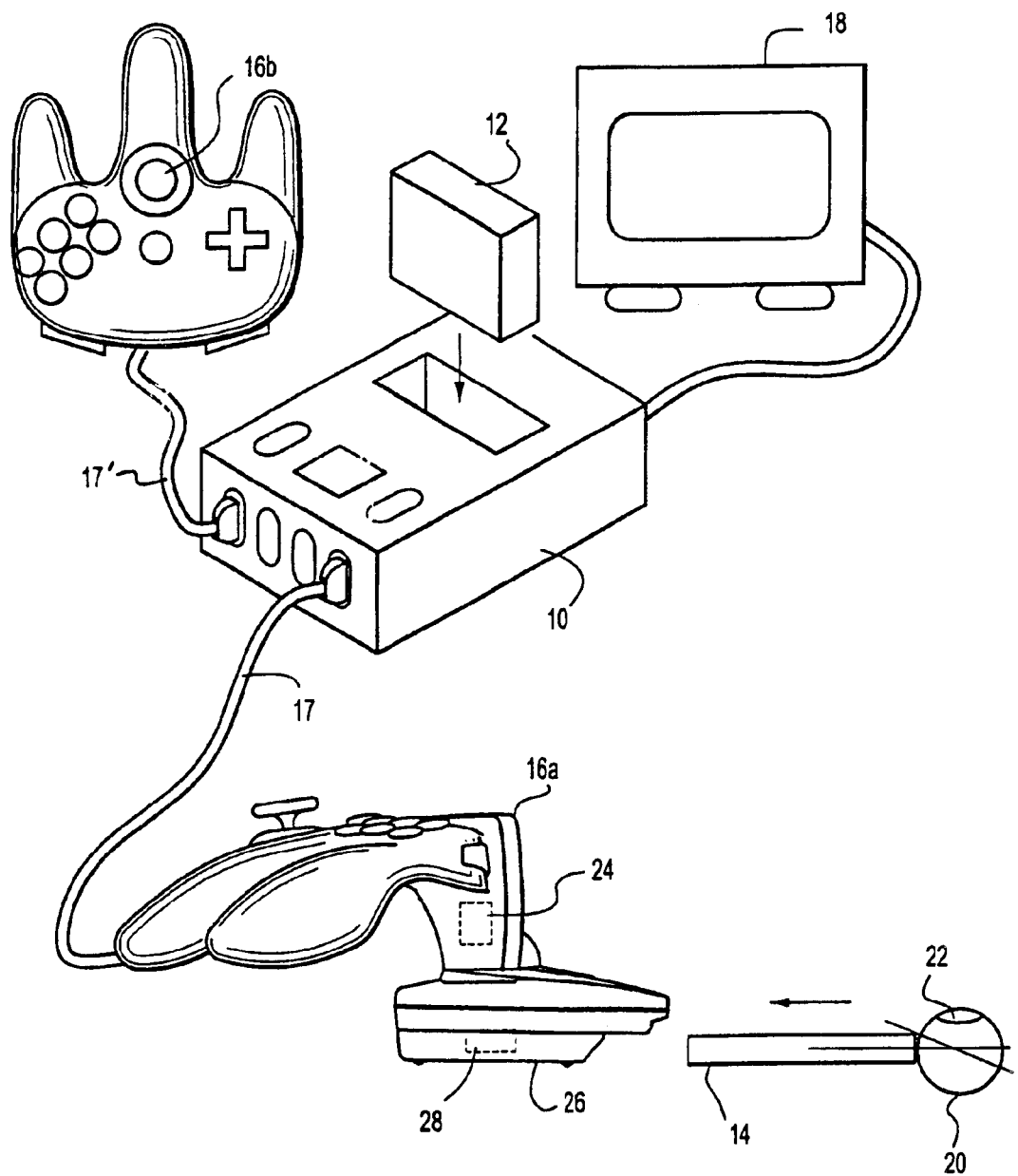
FIG. 1 is an external perspective view showing an exemplary structure of a game machine embodying the present exemplary non-limiting implementation.

FIG. 1 is a block diagram of a game system according to one embodiment of the present exemplary non-limiting implementation. The machine is, for example, a game machine 10 (e.g., the product "Nintendo 64") utilizing an advanced technology, such as 32 or 64 bits, which is high in processability (i.e., processing capability, for example, in CPU bit number, CPU program processing capability per unit time or image representability). The machine uses a removable memory cartridge 12 (hereinafter referred to as "cartridge") as one example of an external memory medium for storing game programs and other data.

Controllers 16a, 16b, such as hand controllers, are electrically connected to the machine 10 typically via wires 17, although a wireless connection may be used. The hand controller has a joystick, buttons, keys and other user input devices for interactively controlling game play as displayed on a television 18. In addition, the hand controller includes an electrical connector 24 which provides a data connection between a removable data transfer pack 26 plugged into the controller and a processor in the game machine. A transfer cartridge is disclosed in pending U.S. patent application Ser. No. 09/189,797 (now U.S. Pat. No. 6,132,315), entitled "Game System Operable With Backup Data On Different Kinds of Game Machines" filed Nov. 12, 1998, the entire contents of which are incorporated by reference. The data transfer pack includes a connector 28 for electrically connecting to other game cartridges, a memory pack cartridge or to a cartridge with digital camera 14, as is disclosed in pending U.S. patent application Ser. No. 09/430,169 (now U.S. Pat. No. 6,435,969), entitled "Portable Game Machine Having Image Capture, Manipulation and Incorporation" filed Oct. 29, 1999, the entire contents of which are incorporated by reference. The digital camera cartridge 14 may be used in connection with the transfer cartridge 26 to interface the digital camera cartridge to the machine, via the transfer pack and controller. An advantage of inserting the digital camera cartridge into a hand-held controller is that a user may easily align the field of view of the camera with a desired subject simply by holding and positioning the controller and camera. In addition, a digital camera cartridge may be inserted into a connector of the controller, while at the same time a game cartridge 12 having an image editor and game program may be inserted in a cartridge connector of the machine. In addition, the digital camera may be inserted into a first hand controller 16a, and a second hand controller 16b may be used to input user control information for capturing, editing and saving an image and to connect to a memory pack (not shown in FIG. 1) for storing data regarding the image and associated personalized 3D head of an animated game player.

The game machine 10 may be a console having one or more processors for executing game programs downloaded from a game cartridge 12, for generating graphical images and sounds related to game play, responding to player commands entered through hand controllers 16a, 16b, and displaying the generated images and sounds on a display 18, such as a television in a manner providing interactive game play between the displayed images and sound, and the user's inputs to the hand controllers.

Figure 2:
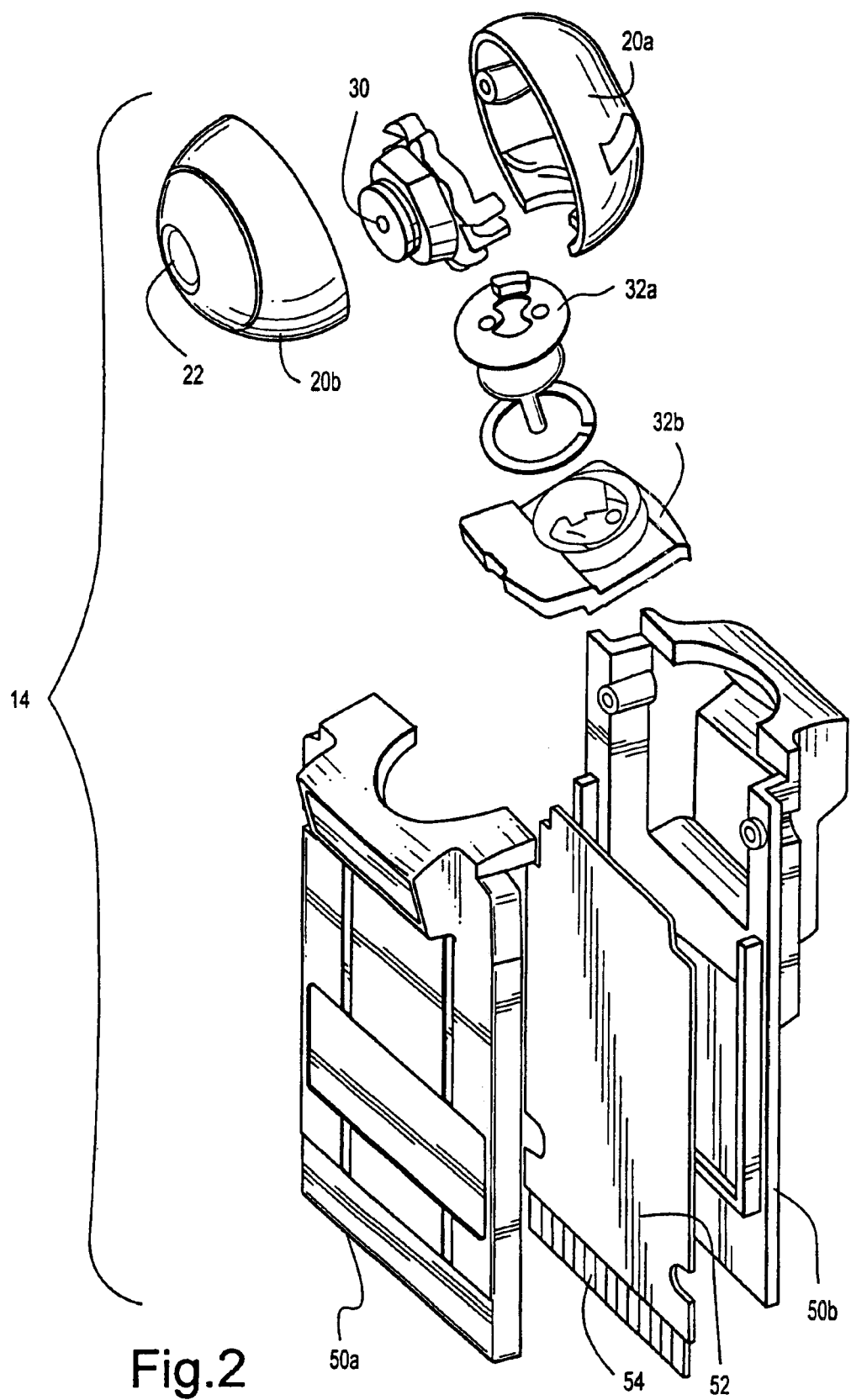
FIG. 2 is a view showing details of the camera cartridge shown in FIG. 1.

FIG. 2 is an exploded view showing the structure of a camera cartridge 14. The camera portion is integrally formed on the upper portion (upper edge) when viewed from the front of the housing 50a, 50b, which contains an electrical circuit having electronics to support the digital camera, memory for storage of 2D digital images and a connector 54 for coupling the camera cartridge to a game machine and data pack. The housing is formed, for example, in a flat, vertically elongated rectangular parallelepiped shape having a prescribed thickness. The connector 54 is provided inside an opening in the cartridge housing 50a, b, opening for contacting with a terminal (e.g., edge connector) of a substrate 52 included in the cartridge to electrically connect a circuit on the substrate to an electric circuit in the housing. The camera cartridge 14 includes a generally spherical camera housing 20a, 20b containing an image pickup device, e.g., lens 22 and CCD 30, and is supported rotatably (in a lateral direction when viewed from the front by the supporting portion) on a mounting 32a, 32b on the housing of the cartridge.

Preferably, the supporting camera housing has a rotation angle range of approximately 180 degrees so that a viewing range of the camera portion can turn to both of the forward direction of the front surface and the backward direction of the rear surface. Further, a mount angle (i.e., an angle which is a mount axis, which is parallel to an optical axis, of the camera portion tilts with respect to the direction at a right angle to one main surface and the other main surface of the housing) is selected in a range of 10 to 45 degrees (preferably, approximately 15 degrees), for example, which is in a upward direction with respect to a depth direction (a direction going through at a right angle from one main surface to the other main surface) of the housing. When the user holds the controller, data pack and camera cartridge with both hands and when the image pickup device points to the forward direction of one main surface, the face of the user who watches the image display device is received by the camera 22, and in reverse, when the image pickup device points in a backward direction the face of a person ahead of the user is received by the camera 22.

In this manner, the supporting portion rotatably supports the camera portion in a lateral direction of the body portion to allow the user to easily change the shooting range by simply changing the direction of the camera portion and also to shoot and display the forward direction of the user and the user himself/herself (or the backward direction toward the user) on the image display device when the rotation range is selected to approximately 180 degrees. Further, the supporting axis with which the supporting portion supports the camera portion is inclined to allow the user to freely adjust the shooting range in the forward direction or on the user side by only slightly including both wrists when holding the housing with both hands, without requiring the user to take an uncomfortable position when adjusting, thereby reducing the fatigue of the wrists.

Figure 3:
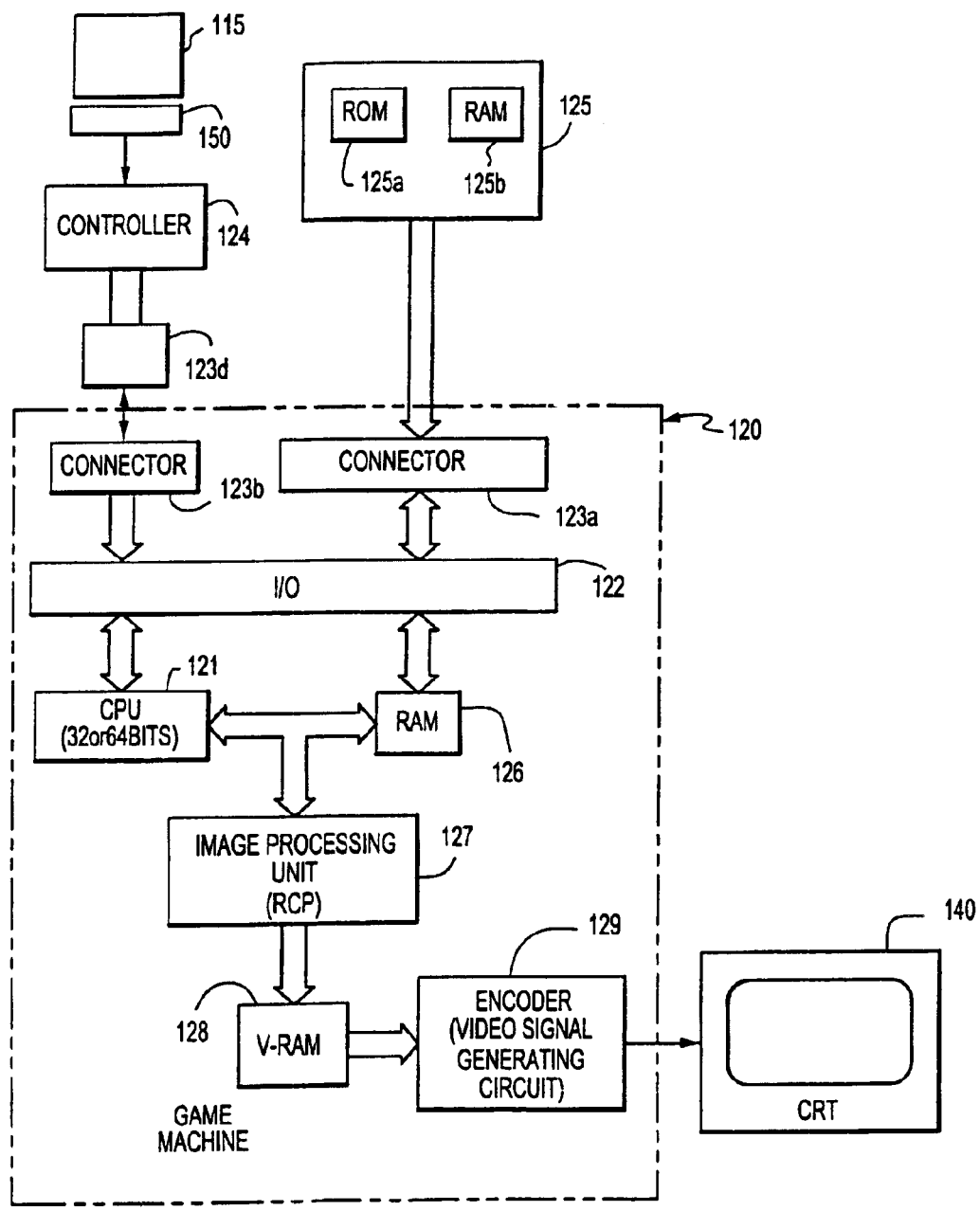
FIG. 3 is a block diagram showing the electrical structure of the exemplary game machine.

FIG. 3 shows a block diagram of exemplary circuits for a game machine having a removable digital camera cartridge, removable data transfer cartridge that is used to capture 2D images and temporarily store those images in memory in the cartridge, e.g., RAM and removable game cartridges.

The game machine 120 includes a CPU 121 that is connected to an input/output interface 122 (hereinafter referred to as "I/O"). To the I/O are connected connectors 123b, 123d for connection with a hand controller 124. Where the game machine 120 is usable for a game in which a plurality of players participate at a same time, a plurality of sets of connectors and controllers are provided. The hand controller 124 may also include a connection 150 to a portable memory pack 115, having a read/write memory for storage of user data, e.g., facial images, to be used during game play. The memory cartridge connectable to the hand controller incorporates, by mounting on a substrate, a nonvolatile memory (e.g., ROM, EP-ROM) for storing image files, editing files and identification codes.

Another connector 123a is disconnectably connected to the game/camera cartridge 125. Further, the CPU is connected to a RAM 126 employed as a working RAM and an image processing unit (RCP) 127. The RAM includes memory areas respectively utilized for a plurality of players, and further including a flag area, a counter area, and register areas. The RCP is connected to a video RAM 128. The video RAM has a memory area for storing red (R), green (G) and blue (B) color data corresponding to each dot of one CRT screen 140 such as a raster scan display, so that color data is written in and/or read from the memory area for color display under control of RCP. The color data read from video RAM is converted by an encoder 129 and/or composite image signal generating circuit into analog R, G, B signals and/or a composite image signal which is supplied to the CRT.

Figure 4:
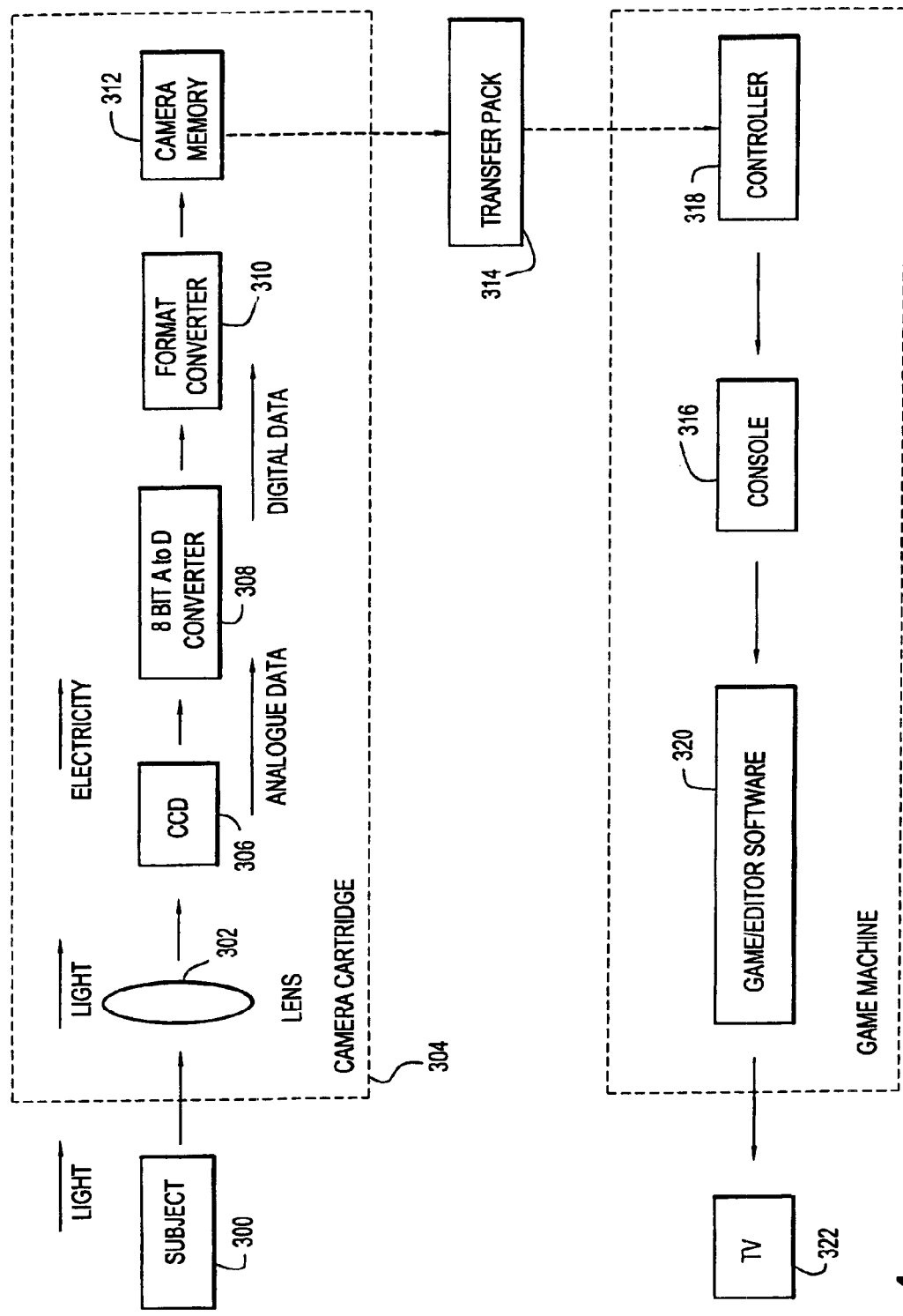
FIG. 4 is a flow chart describing the image capturing operation of the exemplary camera cartridge.

FIG. 4 is a block diagram of the components for capturing an image of a subject 300, e.g., a face of a person. Light reflected off of the subject towards the digital camera cartridge 304 is focused by a lens 302 onto a charged-coupled-semiconductor device (CCD) 306. The CCD generates electrical signals representing an image of the subject. An analog-to-digital converter 308 converts the electrical signals into a digital image of the subject. The digital image is formatted by another converter 310 into a digital file that is stored in a RAM memory 312 in the camera cartridge 304. The memory 312 may save several digital image files representing different pictures. In addition, these image files can be written into memory over existing files, so as to erase those overwritten image files.

The camera cartridge 304 may be inserted into and electrically coupled to a data transfer pack 314 to transfer the digital image files into the memory of the game machine console 316. The transfer pack is a digital coupling device for transferring data and program files from one game cartridge (which may be normally incompatible with the game machine) into the RAM memory of the game machine so that those files may be used during game play. The transfer pack 314 may connect to a controller 318, e.g., hand controller, of the console 316 of the game machine. The game machine console 316 may also have a removable game program cartridge 320 inserted into a connector. The software of the game program is downloaded from the cartridge into the memory of the game machine during game initialization. The processors in the machine execute the game program, which includes image capture and editing programs. These programs display the image of the subject on a display 32'.

Figure 5:
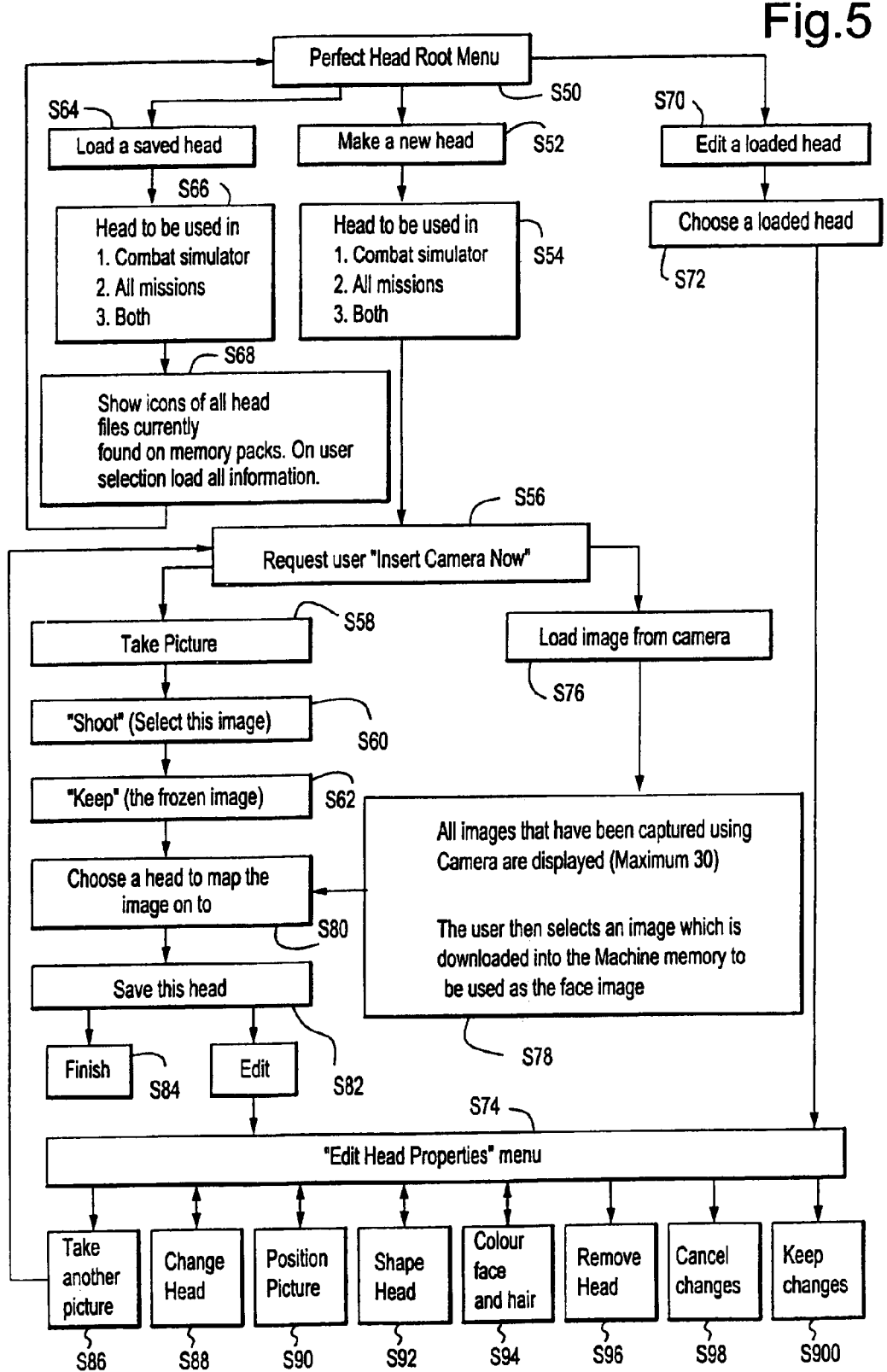
FIG. 5 is a flow chart describing exemplary image capture, transfer and editing functions.
Figure 6:
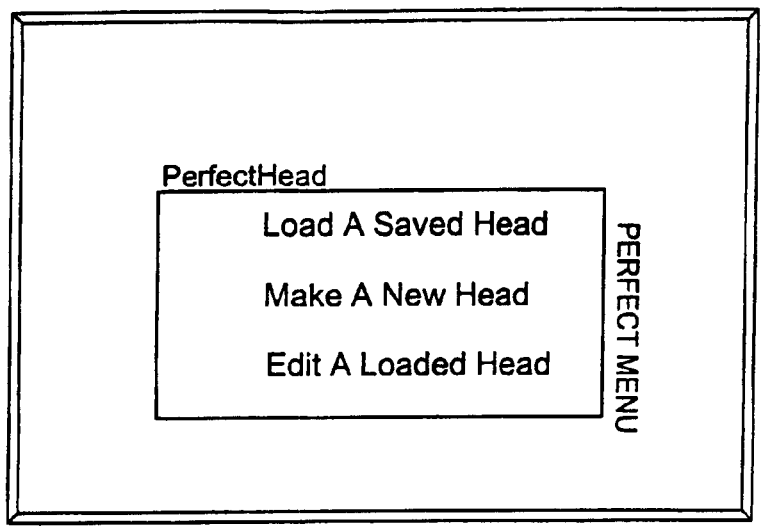
FIG. 6 is an exemplary video game screen image generated by an exemplary video game system that prompts a selection for generating an animated head of a game player.

FIG. 5 is a flow chart of an image capture/editing/storage computer program (stored in the game cartridge 12 and downloaded into RAM 126 during game initialization) for capturing an image of a person's face, mapping the two-dimensional (2D) image onto a face of a three-dimensional (3D) head of an animated game player, editing the facial image and saving a personalized 3D head of an animated game player. The program may be included in a video game program to enable users to create personalized animated game players for game play. A root menu, step S50, of the program provides a starting point of the program and generates a screen menu (FIG. 6) that prompts a user to load a saved personalized head from memory for game play, create a new personalized head or edit a saved head prior to game play.

Figure 7:
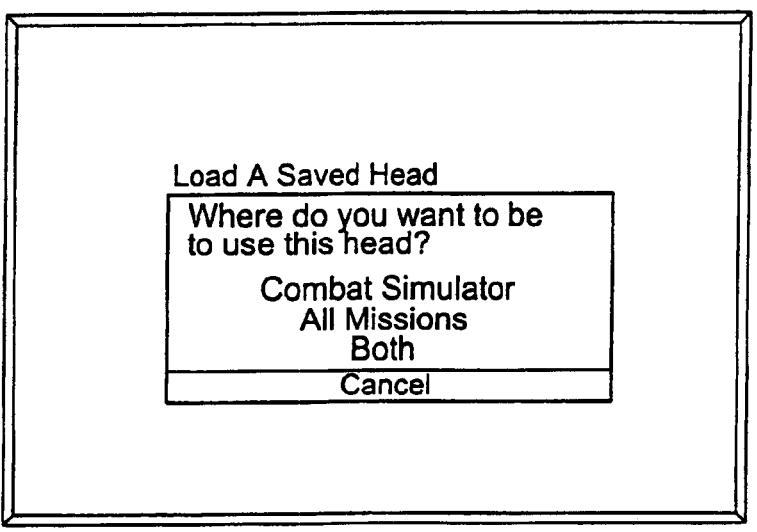
FIG. 7 is an exemplary video game screen image that prompts a selection of a type of game play to which the generated animated head is to be applied.
Figure 8:
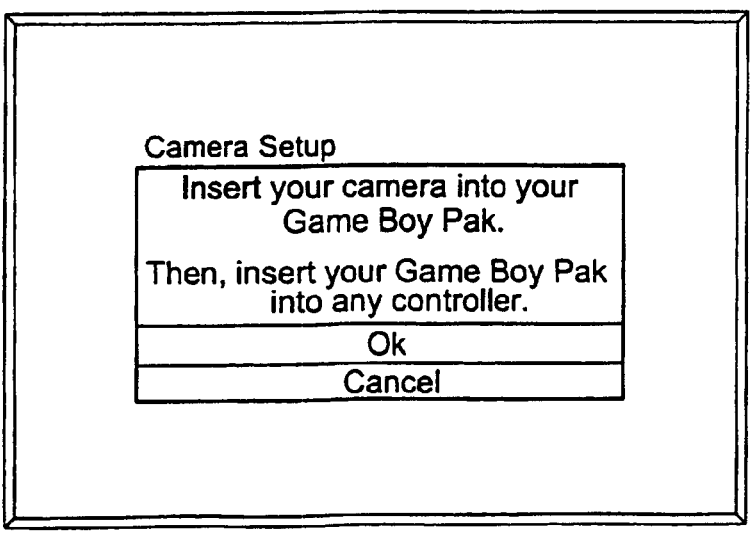
FIG. 8 is an exemplary video game screen image that prompts the insertion of a an image capture and/or transfer device, e.g., a digital camera cartridge, into the game console as a temporary replacement of a game cartridge with the image editor.
Figure 9:
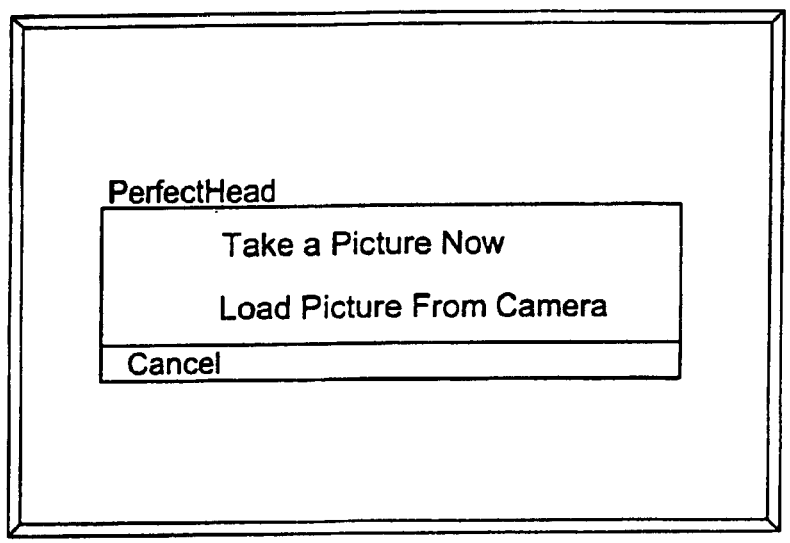
FIG. 9 is an exemplary video game screen image that prompts the capturing of a digital image for insertion into the video game.

When a user selects generation of a new head, step S52, the program may generate a screen menu (FIG. 7) asking the game play type in which the head will be used, e.g., player vs. player combat simulations, single player mission game play, or both. This selection of play type, S54, may useful where the game program uses, e.g., allocates different memory locations, different animated players for different types of game play. Once the type of game play has been selected for the new head, the program prompts, step S56, the user to load a two-dimensional (2D) image of a facial image to applied to the face of the head being created. The user is invited to insert a camera during the "Insert Camera Prompt" (FIG. 8). At this stage the transfer pack is inserted into one of the game controllers 16a, and the camera 14 is inserted into the transfer pack 26. The user is prompted to select either: (i) capture a live image using "real time" data that the camera is receiving, or (ii) search the contents of the camera memory for images that have been stored when the camera has been previously used in the digital camera cartridge (FIG. 9).

Figure 10:
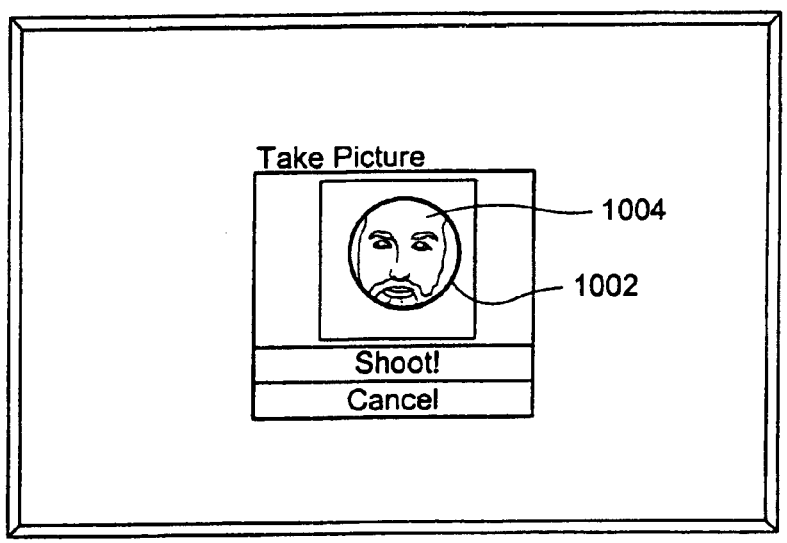
FIG. 10 is an exemplary video game screen image that displays a real-time 2-D image being captured by a digital camera inserted into the game console, wherein the screen image includes a prompt to select, e.g., "shoot", desirable real-time images.

The camera may be used to take pictures of the face of the user, where one or more of the pictures are to be chosen to be applied to the animated head being created. During the image capture step S58, a screen is displayed (FIG. 10) that shows the camera image 1002 currently being viewed by the camera. The camera may have functions to steady the image, and to automatically adjust the brightness and contrast of the image to compensate for background lighting.

During image capture, an oval template 1004 is displayed on the screen to prompt the user to center his face in image capture area. During the "Take Picture" menu (FIG. 10) the current visual image as being received by the camera is displayed on screen, and is updated by the camera at around 2 times per second. A blue transparent overlay template 1004 highlights a vertical oval area of the image which is deemed to be the ideal position for the user to position his or her face. Face images that fit correctly with this oval will need little fine tuning and as such the whole capture/editing process is speeded up by properly positioning the user's face in the oval. The user moves before the camera so that his head is centered in the oval template shown in real-time on the screen.

Showing the oval template during image capture enables the user to take a better picture of himself and reduces the need for subsequent editing of the captured image. When the user is satisfied with the real-time image of himself (or other person or scene) being displayed within the oval template, the user activates a key on the hand controller to capture the image S60. The hand controller is the user input device through which the user selects options presented on the display screen and to otherwise interact with the program. The hand controller used to select an image need not be the controller supporting the camera.

Figure 11:
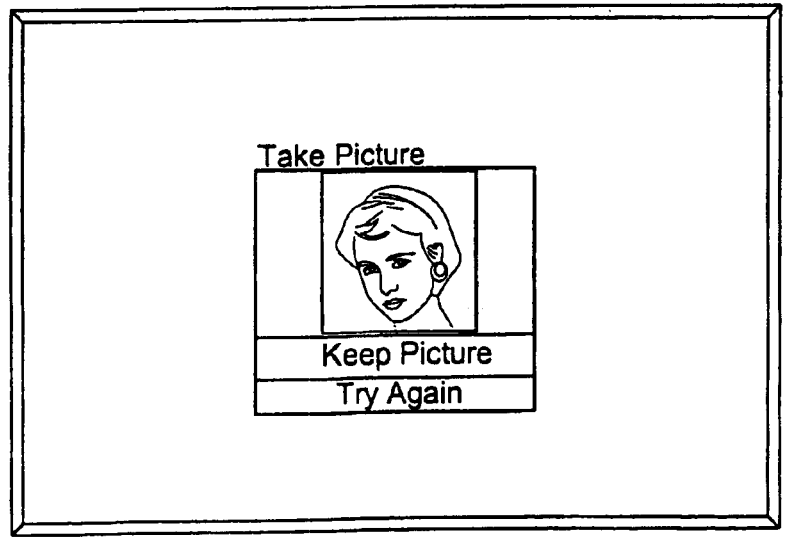
FIG. 11 is an exemplary video game screen image displaying a selected 2-D image captured from a digital camera, and includes a prompt to save image or return to real-time image display.

After selecting an image to capture, the processor captures the image by storing the 2D image in memory, such as the image capture memory of the camera or a memory location in the game console. The captured image is displayed on a similar screen (FIG. 11) as was used for image selection. The captured image may be selected S62 or deleted so that the screen again displays a real-time image of the camera view so that another image may be selected.

A facial image may also be selected by choosing one of the stored 2D images in the camera cartridge (FIG. 9) or by choosing personalized 3D animated game player stored in a game pack or other memory device coupled to the game pack, controller or machine. If a personalized 3D head is selected (S64), the user may be first prompted to identify the game mode, e.g., multi-player combat, single player missions or both, in step S66. The user is then presented on the display with the 3D personalized heads for selection in S68. The user may then begin game play or edit (S70, S72, S74) the existing head.

In addition, the user may select an existing 2D image, such as those stored in the digital camera in S76 from a selection of images that are stored in the camera, S78. These pre-existing images may have been taken by the user while outside or some other location remote from the game console, or may have been taken of the face another person, animal or thing, e.g., the face/grill of a car.

Figure 12:
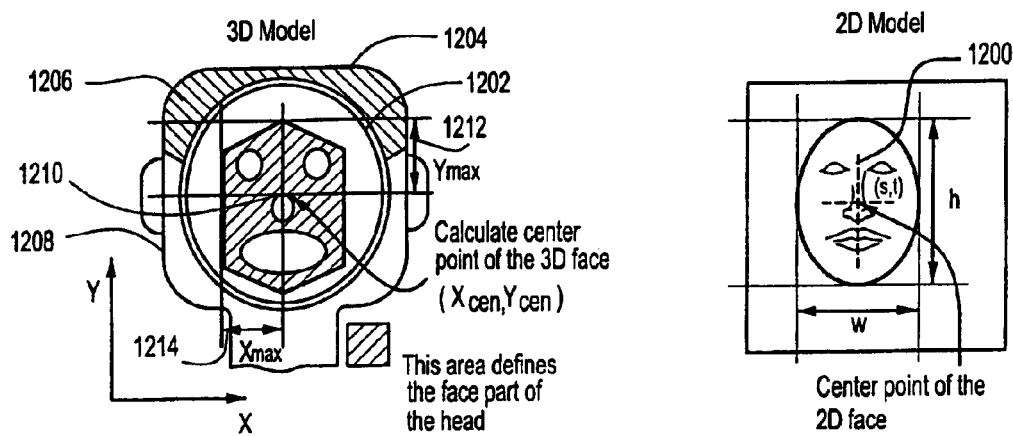
FIG. 12 is a schematic diagram showing the mapping of a 2D facial image onto a 3D face of a 3D head.

Once a pre-existing image is selected, the image is transferred from the camera memory to memory in the game machine, in step S80. Regardless of whether the image is a preexisting image or an image captured from a real-time camera image, the program saves the image in temporary memory in the game machine so that the image may be applied to a head and edited, in step S82. The mapping of a 2D image onto the head may occur during start-up of each game (as the existing heads are readout of the memory pack) and, during the editing process, as 3D heads and 2D facial images are being edited. The major portions of each 3D head are its face, hair and sides (neck and sides around the ears). The two-dimensional facial image 1200 is mapped to the face portion 1204 of the 3D head 1206, as is shown in FIG. 12. The hair 1206 and sides 1208 of the head are not mapped with a 2D image. The 3D face area 1202 is a 3D generally oval surface. This face area surface is defined mathematically by computer software as triangles, e.g., 20 triangles, that when assembled together form a 3D surface of the face of the head. To generate a 3D face to be inserted in a head that may be oriented from the front, side, looking-up, looking down or other point of view, the computer determines the location and position of each of the triangles that define the face. The location in three-dimensions of the surface of the face is determined by determining the location of each of the mathematically defined triangles that form the 3D face image.

The 2D facial image is applied to the 3D face by mapping the 2D image to the triangles that form the 3D face. For mapping, the 2D image is segmented into triangular sections that correspond to the 3D triangles of the face. The segmentation is done by identifying three points on the 2D image that correspond to the corners of each triangle of the 3D face. The section of the 2D image within the triangle defined by each of the three identified points is mapped onto the corresponding triangle of the 3D face. For example, one of the triangles of the 3D face portion may correspond to the nose of the face. To map the nose of the 2D image to the 3D nose triangle, three points on the 2D image are identified that outline the nose shown in that 2D image. The 2D image within the triangle defined by the three selected points are mapped to the triangle corresponding to the nose of the 3D face. Similarly, the other triangular sections' 2D image are mapped to the other triangles that make up the 3D face. The mapping of the 2D image onto a 3D face is accomplished each time the video game starts up and during editing.

Figure 13:
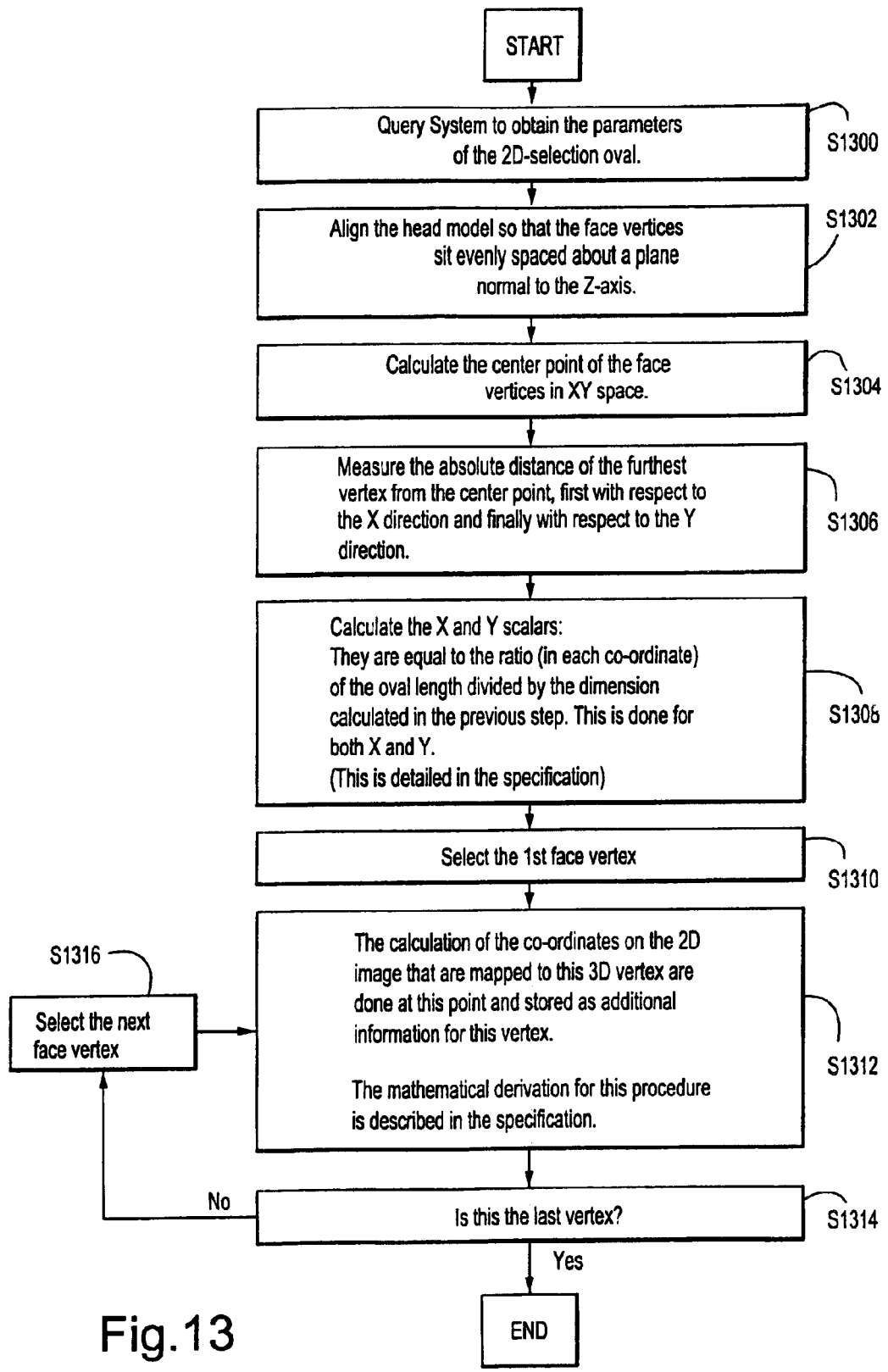
FIG. 13 is a flow chart of the steps for mapping a 2D facial image onto a 3D head.

FIG. 13 shows a flow chart for mapping a 2D image onto a 3D face. In step S1300, the parameters of the oval 2D facial image (see 1200 of FIG. 12) are obtained from the stored image. The face 1202 of the 3D head 1204 is aligned in 3D such that the 3D face is aligned with a 2D plane that is orthogonal to the z-axis. In particular, the vertices that define the facial surface are oriented with respect to the 2D plane such that the vertices are evenly spaced on either side of the plane, S1302. In step 1304, the center point 1210 of the 3D face is determined as follows:

With reference to the 3D model, the center of the face is determined by equation (1):

$$X_{cen} = \frac{1}{n}\sum_{i=0}^{n} VX_i$$

$$Y_{cen} = \frac{1}{n}\sum_{i=0}^{n} VY_i$$

wherein the nomenclature for the above equation (1) is:
n—number of vertices in the face part of the head model.
$VX_i$—X co-ordinate of the i'th vertex
$VY_i$—Y co-ordinate of the i'th vertex
(s,t)—position of center of the oval in x and y respectively
w—width of the oval (in X direction)
h—height of the oval (in Y direction)

In step 1306, the far edges of the 3D facial images are determined by the following equations (2) and (3):

$X_{max}$=Maximum distance in x direction of any vertex from the center of the face $X_{cen}$ (equation 2)

$Y_{max}$=Maximum distance in y direction of any vertex from the center of the face $Y_{cen}$ (equation 3)

The transformation scalars, S1308, that convert the position of a 3D face vertex (xyz) into a corresponding 2D co-ordinate on the face image may also be referred to as a texture co-ordinate. This position dictates the corresponding position in 2D space that the 3D-vertex position should represent.

$$X_{scalar}=w/(2*X_{max}) \qquad \text{Equation 4}$$

$$Y_{scalar}=h/(2*Y_{max}) \qquad \text{Equation 5}$$

To calculate the transformed (texture) co-ordinates, equations 4 and 5 are applied to each vertex, S1310, S1312, S1314 and S1316.

The i'th transformed vertex has co-ordinates in X and Y and these are defined as the U and V texture co-ordinates whereby:

$$U_i=s+(VX_i-X_{cen})*X_{scalar} \qquad \text{Eq. 6}$$

$$V_i=t+(VY_i-Y_{cen})*Y_{scalar} \qquad \text{Eq. 7}$$

$U_i$ and $V_i$ are included in the 3D information of the face which is used to draw the head with the relevant areas of the 2D image mapped onto the 3D triangles that make up the face model.

The stored 3D "heads" which the user selects are stored in the game program (or memory controller pack) as "slots" S82. When completed, the one slot contains all the information to generate a custom character head. This includes face texture information, hair and face colors, head type, etc. The game allows multiple slots for multiple heads that can be used in the single player version of the game where the custom heads can be used for either your player character's head or that of a random guard or other computer-controlled game character.

The customer heads, i.e., those generated using a 2D facial image and the image editor, can be used throughout game play for those animated players controlled by individuals and for the computer generated animated players. In multi-player mode, there may be more head slots, e.g., twelve, to be stored because there is the potential of multiple memory packs in each of the hand controllers being used by the multiple players.

Figure 14:
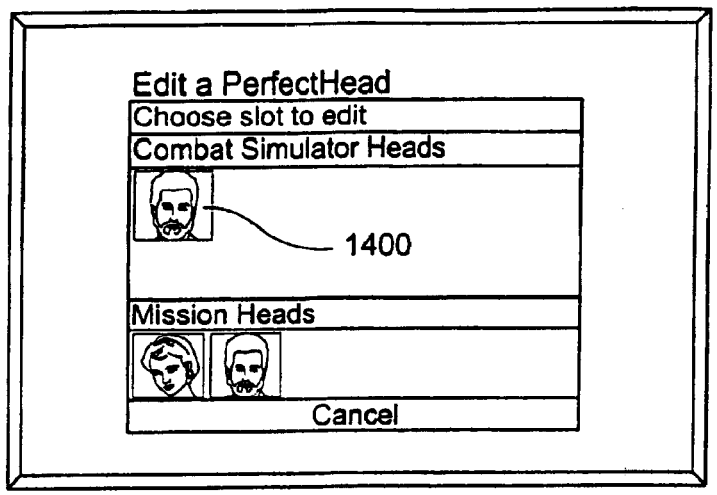
FIG. 14 is an exemplary video game screen image displaying a selection of 3-D heads on which has been superimposed the saved 2-D image.

When loading files that are previously saved S64, S70, on the memory packs, a menu appears whereby icons representing the stored files are displayed on screen, FIG. 14. The icon image of each head 1400 is a reduced size version of the captured image. The user selects an image using the controller and hits the trigger to load the head. The data that is loaded from the memory pack includes a compressed version, e.g., JPEG compression, of the original image taken from the camera and all other parameters set up by the user; these include head type, color, etc.

Figure 15:
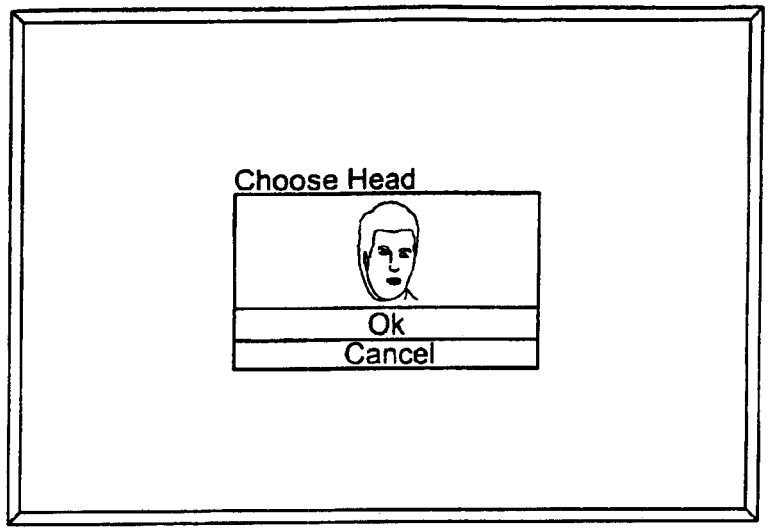
FIG. 15 is an exemplary video game screen image showing a 2D facial image mapped on a head and a prompt to save this personalized head.

Once a facial image has been selected, the user is prompted to apply the image to an animated three-dimensional head, in step 568 and shown in FIG. 15. The machine may have stored several, e.g., five, animated 3D heads which are used to create animated game players. These heads may be male or female, and have different shapes, hair color and skin tone. The heads are presented on the display as individual 3D head images. The heads may have blank faces, a computer generated face or have the face of the 2D facial image that has been captured and selected for use in creating a personalized head. The heads may move, e.g., turn from side to side and tilt up and down, so that the user may see the head from different angles. The user selects a head on which to apply the facial image that has been captured.

Figure 16:
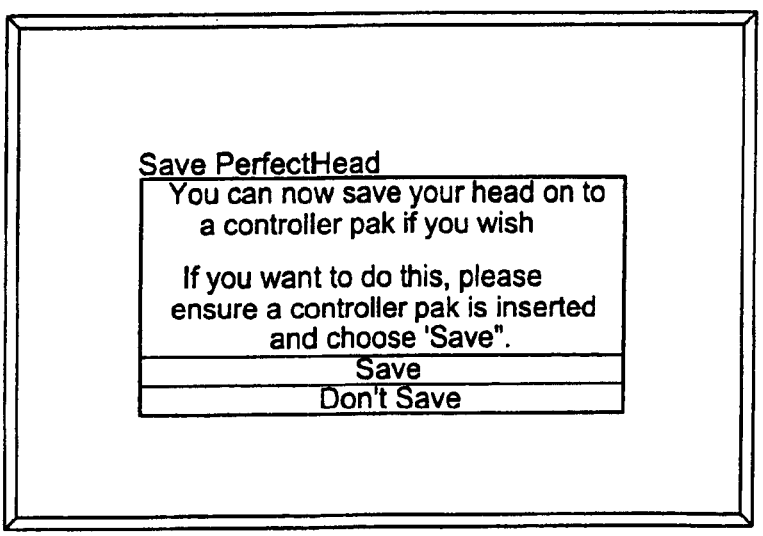
FIG. 16 is an exemplary video game screen image displaying a message regarding saving a personalized head in a section of video game system memory dedicated for user files, and includes a prompt to save the head in memory.
Figure 17:
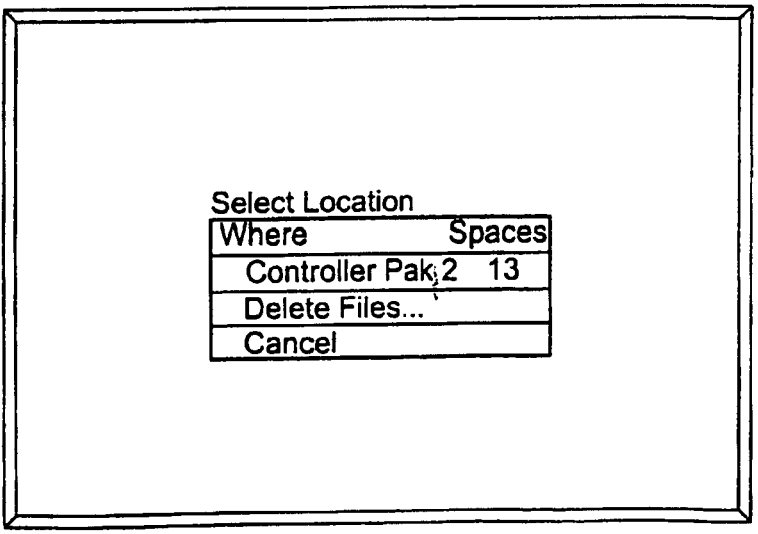
FIG. 17 is an exemplary video game screen image that provides a selection of memory locations which may include a saved personalized head.

Once a head is selected, the program maps the 2D facial image (as framed by the oval template) on the face portion of the selected head. Alternatively, the computer may have automatically mapped the image onto each of the heads displayed for selection. The head selected by the user is saved, in step S82 at a location in memory that may be selected by the user as is shown in FIGS. 16 and 17. The user is given the option to save S84 the current head information to a controller pack so that the head can be easily retrieved at any time. It may be the user only wishes to use the head in this instance of the game or that he or she does not own a controller pack. If either of these is the case then the head need not be saved.

Figure 18:
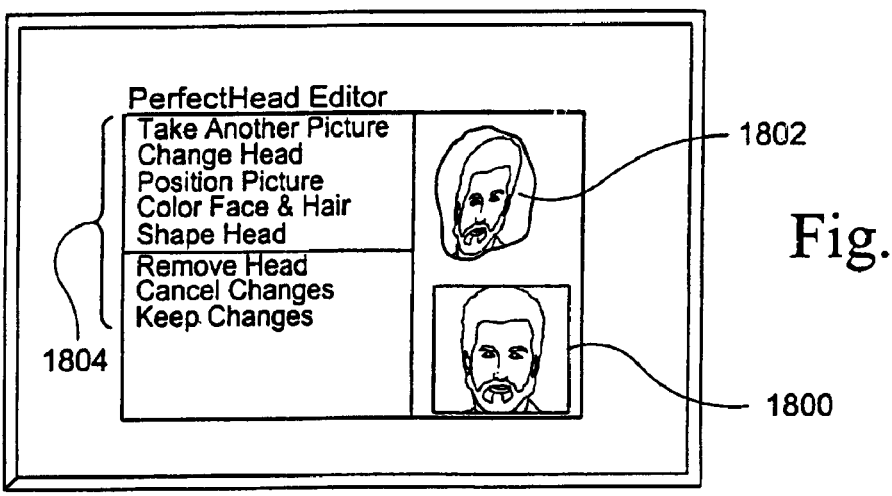
FIG. 18 is an exemplary video game screen image that prompts a user to edit a completed personalized 3-D game head.

The saved head is ready for game play and may be applied to the body of an animated game player so that play may begin in step S84. At this stage all the information is available to display a custom head. Various options will still be in their default modes but these may be changed at a later time using the editor menu, FIG. 18, and step S74. The editor menu may display both the 2D image of the face 1800 that may include a translucent oval template to indicate the portion of the image that is being mapped to the 3D head 1802, that is also shown in the menu. In addition, the menu may display a list of editing commands 1804 for use in editing either or both the 2D image 1800 or 3D head 1802.

To edit an animated 3D head with a mapped 2D facial image, the user selects one of several available editing functions, including select a new 2D facial image S86, select a new 3D head S88, repositioning the 2D facial image S90, adjusting the 3D shape of the head S92, changing the hair color and skin tone of the head S94, deleting the saved head S96, canceling any changes S98 that have been made to a saved head during the editing process, and saving any changes made to the head and facial image S1100.

In particular, the editor contains various sections to alter the characteristics of the current head, these including:

Take Another Picture (S86)

This option leads to the "Take Picture" menu allowing the user to change the image that is mapped onto the head's face.

Change Head (S88)

The "Change Head" function allows the user to alter his or her choice of the special face mapping enabled character heads.

Position Picture (S90)

Figure 19:
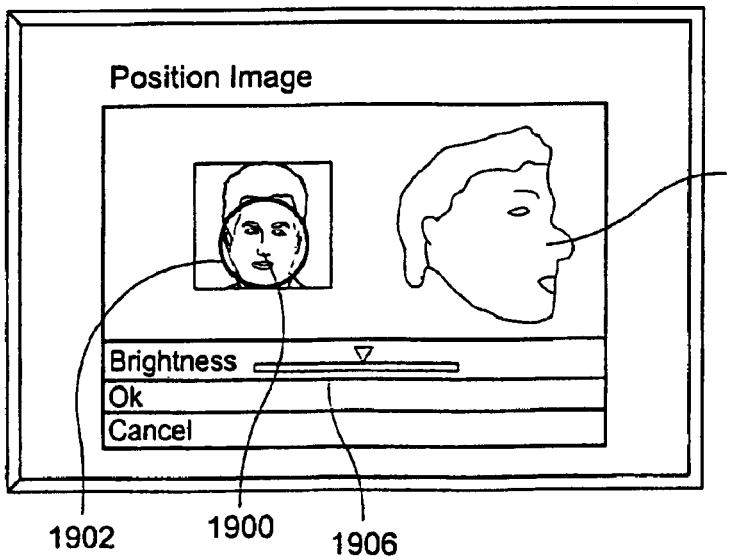
FIG. 19 is an exemplary video game screen image that shows an image editor for viewing a 3-D rotating personalized head in juxtaposition with the 2-D facial image mapped to the head, and includes prompts for editing features and other image commands.

This menu allows the user to change which parts of the captured image are mapped onto the head's face. Five control handles allow the size, shape and position of the aforementioned oval area to be altered, as is shown in FIG. 19. The software maps the 2D image that falls inside this oval onto the facial area of the head. An additional "Brightness" feature allows the user to change the brightness of the facial image helping to disguise the joint between the face and the rest of the head.

The editing by the user of the captured 2D image S90 includes: adjusting the position of the oval template over the 2D image, expanding and contracting the oval shape about the major and minor axes (length and width) of the oval, and adjusting the brightness of the 2D image 1900 in FIG. 19. The oval template 1902 defines the portion of the 2D image that will be mapped to the 3D face. The template is translucent so that the entire 2D image (both inside and out of the template) may be viewed—which facilitates the positioning of the template on the 2D image. The template can be moved with respect to the 2D image by use of cursor commands and drag points that are on the rim of the oval and that can be manipulated by the user with the hand controller and a cursor that appears on the image in FIG. 19.

Moving the template with respect to the image allows the user to better align his face in the oval template and, thereby, adjust the alignment of the facial image on the 3D head 1904. Expanding and contracting the length and width of the oval also allows a user to better position his facial image within the oval and, thus, onto the 3D face (head).

The editing of the 2D image is done with a screen display of the 2D image in the oval and a mapped 3D image, which shows in real time the effect of editing the 2D image. In addition, the brightness/contrast 1906 of the 2D image may be adjusted during 2D image editing.

The oval 2D image becomes distorted when mapped to the 3D face, especially as various sections of the 2D image are deformed to fit the triangles that make up the 3D face. Allowing editing of the 2D image allows the user to improve his 3D facial image by adjusting the 2D image before it is mapped. The still image editor displays the 2D image and the 3D image (with limited rotation of the head) during the editing process so that the user can view the ultimate 3D image of his face while editing the 2D image.

The 2D image editor may also automatically balance the contrast of the image to reduce the unintended effects of shading on the 2D image. These shading effects can cause poor 3D visual effects when the 2D image is mapped on the 3D face. To balance the contrast, the image editor compares the brightness of the left side of the image to the right side of the image. If the brightness between the two sides varies excessively, such as by more than 10%, then the editor reduces the brightness on the bright side of the image and may increase the brightness on the dark side of the image. In addition, the brightness/darkness adjustments are more pronounced at the edges of the oval image than at the center because the brightness adjustments are applied in a linear manner in which the center of the image is not adjusted so as to avoid creating a perceptible contrast change at the center of the image.

When using a digital camera to take an image in "real" world conditions, it is often found that the brightness of the image is not consistent across the image when measured from left to right. This can create problems with face image mapping as the brightness of the join line at each side of the head is at the same brightness. The join line is the 3D surface line where the face portion of the head meets the sides of the face. If there is a difference in brightness at the join line, the result is a distinct and unwanted shade discontinuity on one or both sides of the mapped head.

In order to combat this effect, "Automatic Shade Compensation" techniques are used during the mapping phase of the operation. This attempt to modify the brightness of the 2D-captured image gives a more even mapping without unduly affecting the "look" of the overall image.

This is achieved by applying a non-linear filter to the 2D image, which modifies the intensity of each pixel as a function of pixel position and based upon the following equations (this filter is applied to the whole image, however only pixels within the oval are used to calculate the filter parameters):

$N_x$=Number of pixels in X direction in the 2D image $N_y$=Number of pixels in Y direction in the 2D image $N_{Summed}$=Number of pixels used in the summation (i.e. Fall within 25% and 75% bounds)

$I_{xy}$=Original intensity of pixel at position (x,y)

$I^T_{xy}$=Transformed intensity of pixel at position (x,y)

$A_{Left}$=Average intensity left of center of the image $A_{Right}$=Average intensity right of center of the image s=Center of the selection oval in x direction t=Center of the selection oval in y direction w=Width of selection oval (x direction)

h=Height of selection oval (y direction)

An intensity value is calculated for each side to generate a measure of the balance error in the current image. In this regard all intensities may be normalized (i.e. Range from 0.00 (Black) to 1.00 (White)). The average intensity is calculated for the left and right sides of the image using all pixels that fall between 25% and 75% of maximum intensity. This helps to reduce errors caused by small artifacts that have extreme intensities.

$$A_{Left} = \frac{1}{N_{summed}} \sum_{x=s-(w/2)}^{x=s} \sum_{y=t-(h/2)}^{y=t} I_{xy}(0.25 < I_{xy} < 0.75)$$

$$A_{Right} = \frac{1}{N_{summed}} \sum_{x=s}^{x=s+(w/2)} \sum_{y=t}^{y=t+(h/2)} I_{xy}(0.25 < I_{xy} < 0.75)$$

Shade compensation is used if $|A_{Left}-A_{Right}|<0.05$.

If shade compensation is to be added then the following filter is applied to the image for pixels left of the center of the image:

$$I^T_{xy}=I_{xy}*(1+(Nx-(2*x)/Nx)*0.5*(A_{Right}-A_{Left})))$$

For pixels right of the center of the image:

$$I^T_{xy}=I_{xy}*(1+((((2*x)-Nx))/Nx)*0.5*(A_{Left}-A_{Right})))$$

Note that at $x=N_x/2$ no intensity changes occur on either side thus preventing a discontinuity from appearing at the center of the image.

Color Face & Hair (S94)

The face and head colors can be each changed to one of four pre-determined types. The user is free to pick any combination of these to suit his or her preference.

Shape Head (S92)

Figure 20:
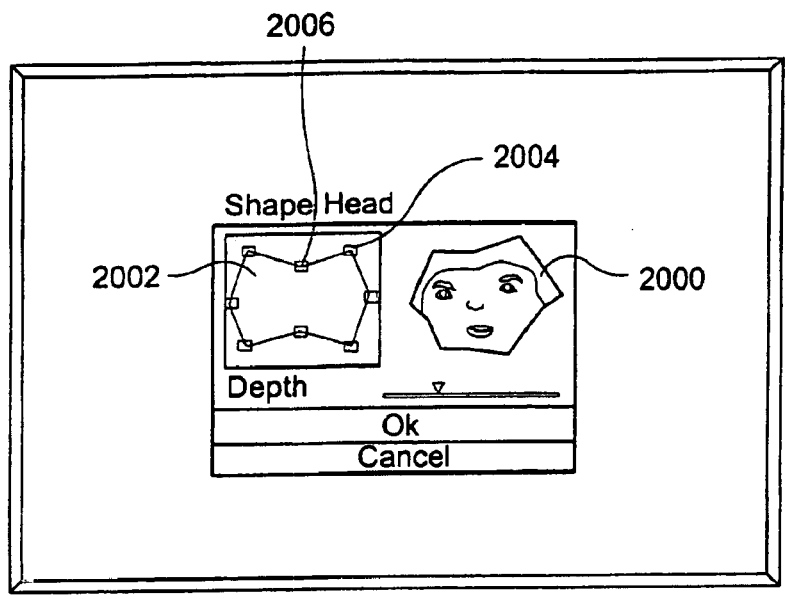
FIGS. 20 and 21 are exemplary video game screen images of an image editor having controls for manipulating the shape of a 3-D head.
Figure 21:
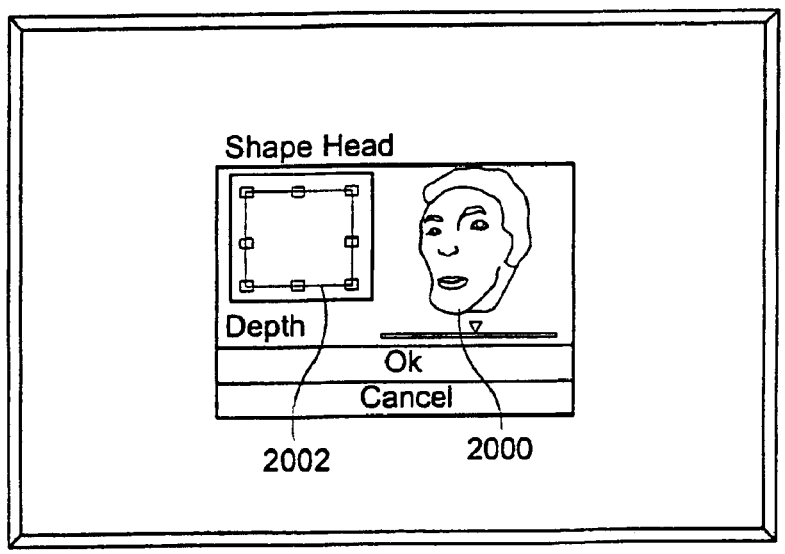

The "Shape Head" feature allows the user to alter the three dimensional shape of the current head as is shown in FIGS. 20 and 21. Control points allow the head to be squashed and stretched in dimensions coplanar to the face and an additional slider allows the depth of the head or scale in the front to back direction to be altered.

The 3D entire head is manipulated, including the face, side and hair. The color of the skin tone and hair can be selected using the editor. In addition, the shape of the head may be changed via a screen (FIGS. 20, 21) that displays the 3D head 2000 (in real-time and showing different viewpoints of the head) juxtaposed next to a box 2002 that is a tool for manipulating head shape.

The box has eight (8) points, located at its four corners 2004 and midway 2006 between pairs of corner, that can be dragged using a cursor and hand controller to change the shape of the box and, thus, change the shape of the head. A comparison of FIGS. 20 and 21 show that by deforming the box (see FIG. 20) the head 2000 is similarly deformed. By adjusting the shape of the head using the box tool, a user can reshape the head to better conform to the real-life head shape of the individual whose facial image is being mapped to the head. Alternatively, the box tool may be used to create a cartoon shaped head or to generate other special effects with respect to the head.

Using the 3D head manipulator, the head can become wide and squared; narrow and oval like, or many other shapes. In addition, a slider bar in this screen stretches or compresses the front-to-back dimension of the head. In addition, by adjusting the slider bar 1906, the head may be stretched from nose to back, so as to generate a head that is long (nose to front) and narrow (side-to-side) or, alternatively, a head that is short (nose to front) and wide (side-to-side).

Other editing functions include:

Removed Head (S96)

Removing a head clears the slot that is currently being edited; all changes are lost.

Cancel Changes (S98)

Canceling changed returns the head to that state that it was in prior to the editor menu being opened.

Keep Changes (S100)

Keeping changes updates the current selected slot with the alterations made during the editing session. Following this the user is again invited to save his or her work to a controller pack.

The personalized heads that were created using the image capture/edit/save functions may be used during game play. Typically, a user will select a personalized head that includes the user's facial image and applies that head to the body of a desired animated game character. In this way, users can personalize game play by having the animated player that they control be a player that has the appearance of the user. During multiple-user combat game play, it would enhance the realism of game play if the animated game players appear in multi-player game mode.

Moreover, the personalized heads may be applied (in a random manner or some prescribed manner, e.g., all guards have a certain head) to computer controlled game characters, such as guards that appear in a combat game, where the guards are not controlled by any of the game playing users. During game play, any heads that occupied the "Single Player Slots" are randomly selected and used as the heads for that particular level of guard characters. Thus, the user will see personalized computer generated players as he plays a game. In addition, if the slots set aside for multi-player games contain any valid personalized heads then these heads may appear (FIG. 14) as a head option when the player chooses to modify his character's properties. Thus, the player may use or edit any of the saved "heads" in the controller memory pack.

The 2D image and settings made with the editor are stored to save a personalized animated game player. The 2D image and settings may be stored in the user's controller memory pack so that they may be carried by the user from one game console to another. The memory pack plugs into the hand controller and may be carried by the user from game machine to game machine and, thus, allows the user to load his personalized 3D animated game player (including a face that is derived from a 2D image of the user) into any game machine that the user may be playing. Thus, an advantage of using controller game packs for storage of personalized player head is that the user can carry personalized player settings to other game consoles, especially those consoles owned by friends. Other advantages of a portable personalized player head stored in the controller memory pack include that friends may play each other where each friend has his or her own personalized player, and personalized images may be formed for the computer controlled players, e.g., automatically generated guards and other "bad guys" to randomly have personalized heads appear on animated figures during the game.

Figure 22:
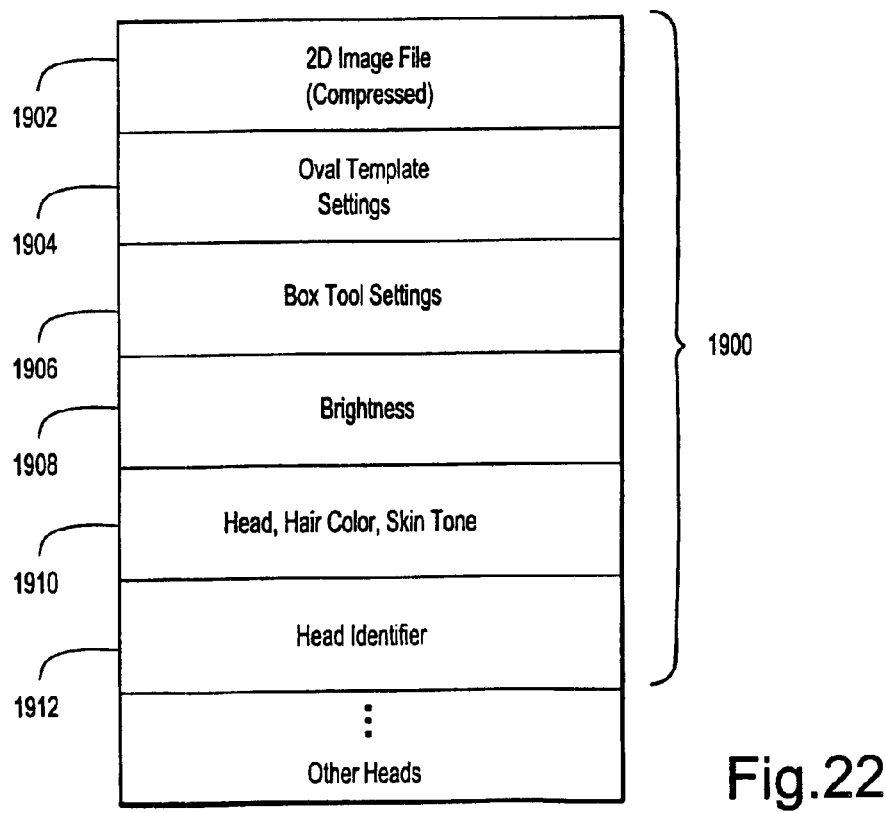
FIG. 22 is an exemplary memory map of a portable controller pack with respect to the storage of personalized game player images.

As shown in FIG. 22, the data file stored in the memory pack corresponding to one personalized head (i.e., the 2D image and head settings) 1900 includes: compressed 2D image 1902; settings of oval shape and oval location, e.g., center point of oval 1904; head, hair color and skin tone settings, collectively 1910; setting points of the eight (8) points of the 3D manipulator section 1906; brightness level 1908, and a unique identifier 1912 for the head.

The saved heads, including 2D facial image, may be compressed to conserve storage space in the memory pack.

A compression technique similar to the well-known JPEG technique may be used. Such a technique would be embodied in a software program included in the image editor program. To compress the slot (head file), a smoothing filter can be applied to the image to eliminate sharp contrast gradients in the image. The image is then divided into blocks, such as 8×8 pixel blocks. A discrete Cosine transformation is applied to each block of the image. A quality controller program may be applied to the blocks defining a compromise between image quality and image file size that is applied to compress the image data without unacceptably deteriorating image quality. The data is re-ordered in a zig-zag pattern to improve compression potential. Then that data is processed by a run length encoder compression scheme and a bit pack compression scheme to create a compressed data file of the image.

Detailed Implementation Example

Roots Though the System: Description

Root Menu (VTC=00:01:08) VTC is "video time code" in hours/minutes/seconds).

The Root menu if the start point for the user to access the Face mapping technology.

Load a saved head (VTC=00:01:11).

This section allows the user to load data previously created into the system. This information is stored in the current game instance as "slots". One slot contains all the information to generate a custom character head, this includes face texture information, hair and face colors, head type etc.

The game allows six slots to be head at one time that can be used in the single player version of the game where the custom heads can be used for either your player character's head or that of a random guard.

The multi-player mode of game ("combat simulator") allows twelve head slots to be stored at any one time. These can be used by any of the players participating in a multi-player game and are used as that player's character head.

The user can select to load a head into the slots available for single player or multi-player or to load a copy of the head into each of these.

Load Perfecthead (VTC=00:01:15)

When loading files that are previously saved on the memory packs, a menu appears whereby icons representing the stored files are displayed on screen. The icon image is a reduced size version of the captured image. The user selects an image using the controller and hits the trigger to load the head. The data that is loaded includes a compressed version of the original image taken from the camera and all other parameters set up by the user; these include head type, color, etc.

Make a New Head (VTC=00:01:24)

To make a new head the user firstly needs to grab an image from the camera, which will be used as a game character's face. As in the previous section, the resultant head can be used in either or both the single and multi player areas of the game.

Insert Camera Prompt (VTC=00:01:24)

The user is invited to insert his or her camera during the "Insert Camera Prompt". At this stage the Transfer Pack is inserted into the Game Controller and the Camera then inserted into the Transfer Pack.

At this stage the user has two options:

1. To capture a live image using "real time" data that the camera is receiving.
2. To scan the contents of the camera for images that have been stored when the camera has been previously used in conjunction with a Nintendo Gameboy.

Take Picture (VCT=00:01:31)

During the "Take Picture" menu, the current visual data as being received by the camera is displayed on screen, this is updated at around 2 times per second. A blue overlay highlights a vertical oval area of the image which is deemed to be the ideal position for the user to position his or her face. Face images that fit correctly with this oval will need little fine tuning and as such the whole processes speeded up.

When the user is happy with the current image, the shoot button freezes and stores the image after which the user can continue with the process or retry the capture.

Choose Head (VTC=00:02:04)

Special character heads were developed that allows the system to add a different facial image. At this stage the user chooses a head whose shape and hairstyle best suits his or her requirements.

Save Perfecthead (VTC=00:02:11)

At this stage all the information is available to display a custom head. Various options will still be in their default modes but these may be changed at a later time using the editor menu.

The user is given the option to save the current head information to a controller pack so that the head can be easily retrieved at any time. It may be the user only wishes to use the head in this instance of the game or that he or she does not own a controller pack. If either of these is the case then the head need not be saved.

Select Location (When saving) (VTC=00:02:13)

If the user is saving a head, the system displays information on any controller packs that it finds that have the adequate amount of free space. The user can also delete previous files to free up room should he or she require to do so.

Head Complete (VTC=00:02:18)

The "Head Complete" menu inform the player that enough information has been gathered to used the head inside the game but invited him or her to edit various features of the head inside the editor feature.

Perfect Head Editor (VTC=00:02:22)

The editor contains various sections to alter the characteristics of the current head, these include:

Take Another Picture (VTC=00:02:25)

This option leads to the "Take Picture" menu allowing the user to change the image that is mapped on to the head's face.

Change Head (VTC=00:02:40)

The "Change Head" function allows the user to alter his or her choice of the special face mapping enabled character heads.

Position Picture (VCT=00:02:45)

This menu allows the user to change which parts of the captured image are mapped onto the head's face. Five control handles allow the size, shape and position of the aforementioned oval area to be altered. The software then maps image data that falls inside this oval on to the facial area of the head. An additional "Brightness" feature allows the user to change the brightness of the facial image helping to disguise the joint between the face and the rest of the head.

Color Face & Hair (VTC=00:03:33)

The face and head colors can be each chanced to one of four pre-determined types. The user is free to pick any combination of these to suit his or her preference.

Shape Head (VTC=00:03:44)

The "Shape Head" feature allows the user to alter the three dimensional shape of the current head. Control points allow the head to be squashed and stretched in dimensions coplanar to the face and an additional slider allows the depth of the head or scale in the front to back direction to be altered.

Removed Head)

Removing a head clears the slot that is currently being edited; all changes are lost.

Cancel Changes

Canceling changed returns the head to that state that it was in prior to the editor menu being opened.

Keep Changes (VTC=00:04:14)

Keeping changes updates the current selected slot with the alterations made during the editing session. Following this the user is again invited to save his or her work to a controller pack.

Edit a Loaded Head (VTC=00:04:20)

Selecting "Edit a Loaded Head" allows the user to choose from any of the currently active slots in the game's memory. On making this choice, the relevant head is loaded into the editor and the changes are made as described in the aforementioned section.

Using the Heads in Game:—Description

Single Player Game

Any heads that occupied the "Single Player Slots" are randomly selected and used as the heads for that particular levels guard characters.

Multi-Player Player Game (VTC=00:04:37)

If the slots set aside for multi-player games contain any valid heads, then these heads will appear as a head option when the player chooses to modify his character's properties. An example of this head selection can be found at VTC=00:04:50.

Additional Information:—Saving Data and File Formats

When a player saves Perfecthead data to a Controller Pack, the image data needs to be compressed both to allow load times and file sizes to be reasonable. The compression is performed using a custom piece of software that:

Applies a smoothing filter to the image to remove any sharp contrast gradients

Breaks the image up into 8*8 pixel blocks

Applies a "Discrete Cosine Transformation" to each of the blocks

Processes this data with a quality controller that makes a compromise between image quality and file size.

Re-orders the resultant data in a "zigzag" patter that maximizes its compression potential Applies a run length encode compression scheme Applies a bit pack compression scheme This system is very similar to the way in which JPEG compression is performed and results in an average compression ratio of 5:1.

Nomenclature:

n—number of vertices in the face part of the head model.

$VX_i$—X co-ordinate of the i'th vertex $VY_i$—Y co-ordinate of the i'th vertex (s, t)—position of centre of the oval in x and y respectively w—width of the oval (in X direction)

h—height of the oval (in Y direction

With reference to the 3D model, the centre of the face is determined by:

$$X_{cen} = \frac{1}{n}\sum_{i=0}^{n} VX_i$$

$$Y_{cen} = \frac{1}{n}\sum_{i=0}^{n} VY_i$$

$X_{max}$=Maximum distance in x direction of any vertex from the centre of the face $X_{cen}$ $Y_{max}$=Maximum distance in y direction of any vertex from the centre of the face $Y_{cen}$ We define transformation scalars that convert the position of a 3D face vertex (xyz) into a corresponding 2D co-ordinate on the face image that is sometimes referred to as a texture co-ordinate. This position dictates the corresponding position in 2D space that the 3D-vertex position should represent.

$$X_{scalar}=w/(2*X_{max}) \quad Y_{scalar}=h/(2*Y_{max})$$

To calculate the transformed (texture) co-ordinates the follow equation is applied to each vertex.

To i'th transformed vertex has co-ordinates in X and Y and these are defined as the U and V texture co-ordinates whereby:

$$U_i=s+(VX_i-X_{cen})*X_{scalar} \quad V_i=t+(VY_i-Y_{cen})*Y_{scalar}$$

$U_i$ and $V_i$ are included in the 3D information of the face which is used by the renderer to draw the head with the relevant areas of the 2D image mapped onto the 3D triangles that make up the face model.

Automatic Shade Compensation

When using the camera in "real" world conditions it is often found that the brightness of the image is not consistent across the image when measured from left to right. This can create problems with face image mapping as the brightness of the join line at each side of the head is at the same brightness. The result is a distinct and unwanted shade discontinuity on one or both sides of the mapped head.

In order to combat this effect "Automatic Shade Compensation" techniques are used during the mapping phase of the operation. This attempted to modify the brightness of the 2D-captured image to give a more even mapping without unduly affecting the "look" of the overall image.

This is achieved by applying a non-linear filter to the 2D image, which modifies the intensity of each pixel as a function of pixel position and based upon the following equations. This filter is applied to the whole image, however only pixels within the oval are used to calculate the filter parameters.

$N_x$=Number of pixels in X direction in the 2D image $N_y$=Number of pixels in Y direction in the 2D image $N_{Summed}$=Number of pixels used in the summation (i.e. Fall with 25% and 75% bounds)

$I_{xy}$=Original intensity of pixel at position (x, y)

$I^T_{xy}$=Transformed intensity of pixel at position (x, y)

$A_{Left}$=Average intensity left of centre of the image $A_{Right}$=Average intensity right of centre of the image s=Centre of the selection oval in x direction t=Centre of the selection oval in y direction w=Width of selection oval (x direction)

h=Height of selection oval (y direction)

An intensity value is calculated for each side to generate a measure of the balance error in the current image. All intensities are normalized (i.e. Range from 0.00 (Black) to 1.00 (White)).

The average intensity is calculated for the left and right sides of the image using all pixels that fall between 25% and 75% of maximum intensity. This helps to reduce errors caused by small artifacts that have extreme intensities.

$$A_{Left} = \frac{1}{N_{summed}} \sum_{x=s-(w/2)}^{x=s} \sum_{y=t-(h/2)}^{y=t} I_{sy}(0.25 < I_{xy} < 0.75)$$

$$A_{Right} = \frac{1}{N_{summed}} \sum_{x=s}^{x=s+(w/2)} \sum_{y=t}^{y=t+(h/2)} I_{sy}(0.25 < I_{xy} < 0.75)$$

Shade compensation is used if $|A_{Left} - A_{Right}| > 0.05$.

If shade compensation is to be added then the following filter is applied to the image.

For pixels left of the centre of the image:

$$I^T_{xy} = I_{xy} * (1 + (Nx - (2*x)/Nx) * 0.5 * (A_{Right} - A_{Left})))$$

For pixels right of the centre of the image:

$$I^T_{xy} = I_{xy} * (1 + ((((2*x) - Nx))/Nx) * 0.5 (A_{Left} - A_{Right})))$$

Note that at $x = N_x/2$ no intensity changes occur on either side thus preventing a discontinuity appearing at the centre of the image.

While this invention has been described in conjunction with specific exemplary non-limiting embodiments thereof, it is evident that many alternatives, modifications and variations will be apparent to those skilled in the art. Accordingly, the preferred exemplary implementations, as set forth herein, are intended to be illustrative, not limiting. Various changes may be made without departing from the full scope of the invention, as defined in the following claims.

What is claimed is:

1. A video game system for playing interactive animated video games using hand-operated handheld controls that produces video game animation control signals in response to manipulation by a user, the video game system including a main game unit that generates game images, including at least one animated three-dimensional player object, for animated display during animated game play, the main game unit including a processor and also having a memory that stores at least a portion of a game program, wherein:

the processor receives said game control signals from the handheld controls, said main game unit generating a display of the animated three-dimensional player in response to accessing a memory storing the game program, the game program including an image editor, wherein the editor maps an imported two-dimensional image onto the animated three-dimensional player object, wherein the game program animates said three-dimensional player to move under control of said game control signals the processor receives from the handheld controls, wherein said processor performs an automatic shade compensation non-linear filter operation that substantially eliminates undesirable shade discontinuities within or alone the edge of the mapped two-dimensional image, said non-linear filter operation modifying the intensity of each pixel in the two-dimensional image as a function of pixel position.

2. A video game system as in claim 1 wherein the imported two-dimensional image is a two-dimensional image of a face.

3. A video game system as in claim 1 further comprising a digital camera coupled to said processor system, and said digital camera captures the two-dimensional image in real time under control of the game program.

4. A video game system as in claim 3 wherein the digital camera is included in a removable cartridge insertable into an insertion port associated with the main game unit.

5. A video game system as in claim 1 wherein the processor comprises a microcontroller and a graphics processor.

6. A video game system as in claim 1 wherein the memory storing the game program and the video editor is included in a game cartridge insertable into an insertion port associated with the main game unit.

7. A video game system as in claim 1 further comprising a player memory electrically coupled to said processor and storing, in the player memory, data indicative of the two-dimensional image as mapped onto the three-dimensional player object.

8. A video game system as in claim 7 wherein the player memory is separable from the main game unit.

9. A video game system as in claim 7 wherein the player memory is a portable removable memory cartridge.

10. A video game system as in claim 9 wherein the player cartridge physically connects to the controls.

11. A video game system as in claim 1 wherein the handheld controls comprise a hand controller separate from the main game unit.

12. A video game system as in claim 1 wherein said handheld controls comprise first and second handheld controllers each having a player cartridge storing data indicative of different two-dimensional images.

13. A video game system as in claim 1 further comprising a display coupled to said main game unit and showing the three-dimensional player object during game play.

14. A video game system as in claim 13 wherein said display is a television.

15. The video game system of claim 1 wherein the image editor provides a coordinate identifier that identifies coordinates on the 2D image to be mapped to triangles for a 3D face.

16. The video game system of claim 1 wherein the image editor is operated by the user of the video game in response to manipulation of said handheld controls.

17. The video game system of claim 1 wherein the image editor allows editing in either a 2D mode or a 3D mode.

18. The video game system of claim 1 wherein the image editor allows editing of a 2D image while displaying the 3D image in real time to show the 3D effects of said editing.

19. The video game system of claim 1 wherein the image editor allows the user to select between plural 3D heads on which to map a 2D image.

20. The video game system of claim 1 wherein the image editor also manipulates a 3D head onto which to map the 2D image, in order improve the appearance of a 2D face mapped onto the head.

21. The video game system of claim 20 wherein the editor provides for 3D head manipulation of both the front view shape and the front-to-back dimension of the head.

22. The video game system of claim 1 further including a portable storage device that stores a representation of a personalized game player.

23. The video game system of claim 1 wherein said image editor maps a 2D facial image onto a 3D head.

24. The video game system of claim 1 wherein the image editor randomly places the two-dimensional image onto computer controlled player objects.

25. The video game system of claim 1 wherein the image editor maps the 2D image onto a selected 3D head.

26. The video game system of claim 1 wherein the handheld controls are disposed on a handheld controller including an insertion slot for receiving a digital camera having a 2D image capture memory disposed therein, said controller insertion slot also receiving a memory for storing a 3D head pre-mapped with the 2D image.

27. The video game system of claim 1 wherein the image editor personalizes a game player to have the face of the user of the video game system.

28. The video came system of claim 1 wherein said video game system includes plural handheld controllers for simultaneous operation by plural associated users each having video game characters associated therewith.

29. The video game system of claim 28 wherein each of said plural video game characters has a personalized face specified by an associated user.

30. The video game system of claim 1 wherein said image editor includes a real time image capture routine that displays a captured image within a template of a predetermined shape.

31. The video game system of claim 30 wherein said template predetermined shape comprises an oval.

32. The video game system of claim 1 wherein the image editor includes a face mapping routine that determines the center of the 2D image relative to a predetermined portion of the three-dimensional player.

33. The video game system of claim 1 wherein the image editor calculates transformed texture coordinates for each of plural vertices of a polygon mesh defining said three-dimensional player object.

34. The video game system of claim 1 wherein the image editor permits the user to edit at least one of the color and the shape of said two-dimensional image by manipulating the handheld controls.

35. The video game system of claim 1 wherein the image editor automatically balances the contrast of the image to reduce unintended effects of shading on the image.

36. The video came system of claim 35 wherein the image editor balances the contrast by comparing the brightness of one side of the image to the brightness of other side of the image, and adjusts contrast in response to results of the comparison.

37. The video game system of claim 36 wherein the image editor applies brightness adjustment linearly across the image without adjusting brightness at the center of the image, in order to avoid creating a perceptible contrast change at the image center.

38. The video game system of claim 1 wherein the image editor applies a non-linear filter to the two-dimensional image so as to modify image intensity as a function of position.

39. In a video game playing system, a method of allowing a video game player to interactively map a two-dimensional image onto a three-dimensional animated object comprising:
   (a) obtaining a two-dimensional image;
   (b) selecting a three-dimensional object comprising a polygon mesh;
   (c) changing, under interactive user control, the shape of the polygon mesh in order to provide a more optimal mapping of the two-dimensional image onto the polygon mesh;
   (d) texture mapping the two-dimensional image onto the shape-changed polygon mesh; and
   (e) animating, on an interactive real time basis, the three-dimensional object including the texture-mapped two-dimensional image as part of animated video game play,
   wherein the method further includes finding the center of the two-dimensional image with respect to the three-dimensional object by defining transformation scalars that convert the position of the three-dimensional polygon mesh into a corresponding two-dimensional texture coordinate to thereby indicate the corresponding position in two-dimensional space that the three-dimensional vertex position should represent.

40. The method of claim 39 wherein the animating step comprises controlling the motion of the three-dimensional object in response to interactive user manipulation of a handheld controller.

41. The method of claim 39 wherein the obtaining step (a) includes capturing the two-dimensional image with a digital camera in real time during video game operation.

42. The method of claim 39 further including repeating said steps (a)–(d) to provide multiplayer game play including plural animated texture-mapped three-dimensional objects interactively controlled by different video game players.

43. The method of claim 39 wherein the shape-changing step comprises changing the dimensions of at least a portion of said object in at least two dimensions.

44. The method of claim 39 wherein the shape-changing step comprises changing the dimensions of at least a portion of said object in three dimensions.

45. The method of claim 39 wherein the two-dimensional image comprises a facial image of an individual having a real-life head shape, and the shape-changing step comprises editing the shape of a three-dimensional virtual head to permit reshaping of the three-dimensional virtual head to better conform to the real-life head shape of the individual.

\* \* \* \* \*